(12) United States Patent
Tayyar et al.

(10) Patent No.: US 7,461,159 B2
(45) Date of Patent: *Dec. 2, 2008

(54) WEIGHTED FAIR QUEUING SCHEDULER

(75) Inventors: Haitham F. Tayyar, Vancouver (CA); Hussein Alnuweiri, Coquitlam (CA)

(73) Assignee: Beckett Mining LLC, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/515,401

(22) Filed: Aug. 31, 2006

(65) Prior Publication Data

US 2007/0050773 A1 Mar. 1, 2007

Related U.S. Application Data

(63) Continuation of application No. 10/164,591, filed on Jun. 10, 2002, now Pat. No. 7,194,741, which is a continuation of application No. PCT/CA00/01448, filed on Dec. 8, 2000.

(60) Provisional application No. 60/169,742, filed on Dec. 8, 1999.

(51) Int. Cl.
  *G06F 15/16* (2006.01)
  *G06F 9/50* (2006.01)
  *H04L 12/56* (2006.01)

(52) U.S. Cl. ............... 709/229; 718/104; 370/395.4

(58) Field of Classification Search ......... 718/100–108, 718/1; 370/230–429; 719/328; 709/200–252
See application file for complete search history.

(56) References Cited

U.S. PATENT DOCUMENTS

| | | | |
|---|---|---|---|
| 5,828,878 A | 10/1998 | Bennett | |
| 5,828,879 A * | 10/1998 | Bennett | 718/102 |
| 5,845,115 A * | 12/1998 | Bennett | 718/100 |
| 5,905,730 A | 5/1999 | Yang et al. | |
| 5,926,459 A * | 7/1999 | Lyles et al. | 370/230 |
| 5,999,963 A * | 12/1999 | Bruno et al. | 718/104 |
| 6,075,791 A | 6/2000 | Chiussi et al. | |

(Continued)

FOREIGN PATENT DOCUMENTS

DE 0989770 9/1999

(Continued)

OTHER PUBLICATIONS

Stiliadis et al., "Rate-Proportional Servers: A Design Methodology for Fair Queueing Algorithms", pp. 164-174, IEEE/AMC Transactions On Networking, vol. 6, No. 2, Apr. 1998.*

(Continued)

*Primary Examiner*—Lewis A. Bullock, Jr.

(57) ABSTRACT

A scheduler which uses a GPS simulation to determine an order in which to service entities uses a novel dynamic data structure with a sophisticated, but simple, pointer update mechanism. Preferred embodiments of the scheduler perform a fixed amount of work per scheduling event. A scheduling event can be either computing a new virtual finish timestamp upon a new arrival to the scheduler, or determining which entities are to leave the GPS system because their finish timestamp has expired. The scheduler may be used in packet scheduling in a packet handling device, such as a router, scheduling access of software processes to a computer processor or the like. The scheduler may implement weighted fair queuing (WFQ).

52 Claims, 9 Drawing Sheets

U.S. PATENT DOCUMENTS

| | | | |
|---|---|---|---|
| 6,081,505 A * | 6/2000 | Kilkki | 370/230 |
| 6,091,717 A * | 7/2000 | Honkasalo et al. | 370/329 |
| 6,094,426 A * | 7/2000 | Honkasalo et al. | 370/331 |
| 6,101,193 A * | 8/2000 | Ohba | 370/429 |
| 6,134,217 A | 10/2000 | Stiliadis et al. | |
| 6,247,061 B1 * | 6/2001 | Douceur et al. | 709/240 |
| 6,330,584 B1 * | 12/2001 | Joffe et al. | 718/107 |
| 6,338,078 B1 * | 1/2002 | Chang et al. | 718/102 |
| 6,396,843 B1 | 5/2002 | Chiussi et al. | |
| 6,412,005 B1 * | 6/2002 | Bennett | 709/226 |
| 6,570,883 B1 * | 5/2003 | Wong | 370/412 |
| 6,584,089 B1 * | 6/2003 | Honkasalo et al. | 370/338 |
| 6,675,229 B1 | 1/2004 | Bruno et al. | |
| 6,725,456 B1 | 4/2004 | Bruno et al. | |
| 6,968,379 B2 | 11/2005 | Nielsen | |

FOREIGN PATENT DOCUMENTS

| | | |
|---|---|---|
| EP | 0859492 | 8/1998 |
| EP | 0917316 A2 | 5/1999 |

OTHER PUBLICATIONS

Davin et al., "A Simulation Study of Fair Queueing and Policy Enforcement", pp. 23-29, ACM, 1990.*

Demers et al., "Analysis and Simulation of A Fair Queueing Algorithm", pp. 1-12, ACM, 1989.*

Parekh et al., "A Generalized Processor Sharing Approach to Flow Control in Intergrated Services Networks: The Single-Node Case", pp. 344-357, IEEE, 1993.*

Office Action for Canadian Patent Application No. 2,393,740, dated Jun. 11, 2007.

International Search Report for PCT/CA2000/001448 mailed on Oct. 15, 2001.

* cited by examiner $TS_1 < TS_2 < TS_3 < TS_4 < TS_5 < TS_6 < TS_7$

WEIGHTED FAIR QUEUING SCHEDULER

CROSS REFERENCE TO RELATED APPLICATION

The present patent application is a continuation patent application of U.S. patent application Ser. No. 10/164,591, filed on Jun. 10, 2002, now U.S. Pat. No. 7,194,741, entitled "WEIGHTED FAIR QUEUING SCHEDULER," which is a continuation patent application of PCT patent application No. PCT/CA00/01448 entitled "WEIGHTED FAIR QUEUiNG SCHEDULER," and filed on Dec. 8, 2000, which claims priority from U.S. Provisinal Patent Application Ser. No. 60/169,742, filed on Dec. 8, 1999 and entitled "A SOFTWARE-ONLY REALIZATION OF A WEIGHTED FAIR QUEUING SCHEDULER BASED ON TRUE GPS SIMULATION".

TECHNICAL FIELD

This invention relates to schedulers for scheduling access to resources on computer systems and data processing systems. In particular, the invention relates to a weighted fair queuing scheduler. The invention may be applied in various contexts including scheduling the dispatch of packets at an interface connected to a data communication link, scheduling the handling of threads by a computer processor running a multi-threaded operating system, or the like.

BACKGROUND

In the field of computers and data communications there are numerous situations in which a number of entities require access to a resource and there is a need for scheduling access to the resource. For example, consider the problem of providing per-flow or per traffic-class quality-of-service (QoS) guarantees in packet networks. In order to provide applications such as real-time communications and/or interactive applications on a network one needs to provide to individual flows guaranteed rates, bounded end-to-end delays, restricted packet loss, fairness, etc. This generally requires the ability to provide resource reservation and scheduling at the involved hosts and intermediate nodes.

A packet network comprises a number of nodes connected by data links. At each node is a packet handling device, most typically a router. Each packet handling device may be connected to a number of outgoing data links. Packets destined to be sent out over a particular data link may accumulate at an interface associated with the data link.

The interface determines an order in which packets should be sent out on the data link. In a simple case the interface may have a single FIFO (First In First Out) buffer. In this case the interface simply sends packets out in the same order that they are received. This interferes with providing QoS guarantees because it permits packets which are "urgent" to become enqueued behind a long line of non-urgent packets. It is not possible to guarantee bounded end-to-end delays for packets passing through such an interface. The current Internet is based on a best-effort service model that does not provide any QoS assurances to different applications. This lack of service differentiation has serious impact on what type of applications can be supported end-to-end on the Internet.

More recent router designs permit packets to be classified into a number of different classes. Each class can have its own queue. A scheduler selects packets from the heads of the various queues in an order intended to maintain QoS levels for the packets in the various queues. In general one assigns to each of the queues a service fraction, which may be expressed as a percentage of the bandwidth on the outgoing data connection to which the queue is entitled. The scheduler attempts to schedule the dispatch of packets over the outgoing data connection in such an order that each queue receives the bandwidth to which it is entitled. The scheduler also attempts to allocate any excess bandwidth fairly. Various schedulers have been proposed.

With the proper dimensioning of network resources, the most important performance attributes of a packet-scheduler become its delay and fairness bounds for each flow. Delay bounds are important for a wide range of time-sensitive or real-time services. Fairness bounds are important for providing a sufficient degree of isolation to a flow of packets, so that the service guaranteed to that flow is not affected by the behavior, or misbehavior, of other packet flows sharing the same link. To provide such guarantees it is normally assumed that packet flows have been conditioned using an appropriate traffic shaper, such as a leaky-bucket conditioner, and that policing is in effect at the network edges.

Generalized Processor Sharing (GPS) is an ideal scheduler that provides every flow its guaranteed bit-rate and distributes excess bandwidth fairly among flows according to their relative bandwidth weights. As a result, GPS can provide end-to-end delays and fairness guarantees to packet flows as long as the flows are well behaved. The flows may be made well behaved, for example, by shaping them using leaky-bucket traffic conditioners. GPS works by assigning a distinct queue to each flow (or session), then servicing an infinitesimal amount from each session according to a weighted cyclical schedule. Unfortunately, GPS is unrealizable in practice because it services a small part of a packet at a time. A real scheduler must complete the service of an entire packet from a session before it moves to the next session. The GPS algorithm is described in A. K. Parekh and R. G. Gallager, *A Generalized Processor Sharing Approach to Flow Control-The Single Node Case"* Proc. IEEE INFOCOM '92, vol. 2, May 1992, pp. 915-24.

In GPS it is assumed that every packet is infinitely divisible. That is, the packets are like a fluid. Assume that N sessions share an outgoing link of capacity r. The relative share of bandwidth reserved by session i is represented by a real number $W_i$ which may be called a "session weight". The values of weights $W_i$ are chosen such that:

$$\frac{W_i}{\sum_{j=1}^{N} W_j} \times r \geq r_i \qquad (1)$$

The quantity $\rho_1$ which is given by:

$$\rho_i = \frac{W_i}{\sum_{j=1}^{N} W_j} \times r \qquad (2)$$

is the service share for session i. r is the rate of the outgoing data connection (or the server) and $r_i$ is the guaranteed bandwidth reservation of session i. If $B(\tau,t)$ is the set of sessions that are backlogged in the interval $(\tau,t]$. Then, under GPS, the service $S_i(\tau,t)$ offered to a session i that belongs in $B(\tau,t)$ is proportional to $W_1$. That is:

$$S_i(\tau, t) \geq \frac{W_i}{\sum_{j \in B(\tau,t)} W_j} \times r(t - \tau) \quad (3)$$

GPS attains its bandwidth guarantees by servicing an infinitesimal amount from each backlogged session in proportion to each session's reservation. As a result, GPS provides perfect isolation, ideal fairness and low end-to-end session delays. However, because GPS is based on the fluid model, it is unimplementable since a scheduling technique will have to serve packets as a whole.

Packet-by-packet GPS, commonly known as weighted fair queuing (WFQ), is a GPS emulation method. In WFQ packets are transmitted according to their finish order under GPS. WFQ simulates a GPS fluid-model in parallel with an actual packet-based scheduler. The GPS simulation determines a virtual finish time (which is used as a timestamp) for packets arriving to the scheduler. To calculate the virtual finish time, WFQ maintains a virtual time function v(t). The virtual time function is a piecewise linear function of real time t. Its slope changes depending on the number of backlogged sessions and their service rates.

More precisely, if B(τ,t) represents the set of backlogged sessions in the scheduler during the interval (τ,t), the slope of the virtual time function during the interval (τ,t) is given by:

$$\frac{\sum_{i=1}^{N} W_i}{\sum_{j \in B(\tau,t)} W_j} \quad (4)$$

To simplify things one can normalize the weights $W_1$ such that:

$$\sum_{i=1}^{N} W_i = 1 \quad (5)$$

One can call the normalized values of the weights $W_1$ "shares". Each session has a share. Each share represents a fraction of the total capacity available which is assigned to the session. In the case of a communication link the total capacity available can be the available bandwidth on the communication link. In the balance of this specification the share of a session is referred to by the symbol $\Phi_i$. Those skilled in the art will realize that it is a matter of design convenience whether or not to normalize the values used to represent the weights $W_j$ in any particular implementation of the invention. It is the relative magnitudes of the weights $W_i$ which is significant. Equivalent implementations which use non-normalized weights $W_i$ could readily be provided.

With $\Phi_i$ defined as above, the slope of the virtual time function becomes:

$$\frac{1}{\sum_{j \in B(\tau,t)} \Phi_j} \quad (6)$$

At the arrival of a new packet, the virtual time is calculated. Then, the timestamp $TS^k_i$ associated with the kth packet of session i is calculated as:

$$TS_i^k \leftarrow \max(TS_i^{k-1}, v(t)) + \frac{L_i^k}{\rho_i} \quad (7)$$

Where $L^k_i$ is the size of the arrived packet.

To perform scheduling in real-time, WFQ must compute the value of the virtual time function before any packet arrival, so that every arriving packet is assigned the correct virtual finish time (as if it will be departing under GPS). The value of the virtual-time function is impacted by arrivals of packets to empty queues, as well as by departures of packets which result in empty session queues.

A severe problem with WFQ is that the GPS simulation may predict that an undetermined (and possibly large) number of session queues should become empty at the same time. Under GPS many packets can end up having the same virtual finish time. In the worst case, as many as N packets may have the same virtual finish time. Therefore, updating the virtual time function in between two consecutive packet arrivals may incur a large number of computations. In particular, if a link is shared by up to N active sessions, then updating the virtual time can incur a computation on O(N) sessions or queues. The number of active sessions can be very large. For example, there may be tens of thousands or even hundreds of thousands of queues feeding a single data link. This translates into a proportionally large number of computations per packet arrival. This problem is called iterated deletion. The iterated deletion problem is discussed in detail in A. Demers, S. Keshav, and S. Shenkar, *Analysis and simulation of a fair queueing algorithm*, Internetworking Res. and Experience, vol. 1, 1990. The iterated deletion problem has prevented WFQ from being successfully implemented in practice.

Because of the high complexity associated with simulating the GPS system WFQ has attracted much research over the past decade. Many techniques have been proposed to simplify the virtual time calculations. Some such techniques are Self-Clocked Fair Queuing (SCFQ), VirtualClock (VC), Start-time Fair Queuing (SFQ), Frame-Based Fair Queuing (FFQ), Minimum-Delay Self-Clocked Fair Queuing (MD-SCFQ) and Discrete-Rate (DR) scheduling. In general such simplifying approaches suffer from either a decrease in fairness (flow isolation) or an increase in the delay bound. In addition, some of these techniques fail to adequately address the iterated deletion problem.

There is a need for practical methods and systems for scheduling access to resources which provide fair access to the resource.

SUMMARY OF INVENTION

This invention provides scheduling methods and systems. The scheduling methods and systems may be used to schedule packets being dispatched onto a communication link, schedule the execution of processes on a computer processor or the like. The scheduling methods and systems may be used in contexts where GPS simulating schedulers such as WFQ or WF²Q might otherwise be used.

Various aspects of the invention provide methods for scheduling entities, scheduling apparatus, data structures useful in schedulers and computer readable media containing instructions which, when executed by a computer processor, cause the computer processor to execute a method according to the invention.

One specific aspect of the invention provides a method for scheduling entities in a computer system, the method comprises receiving at a scheduler entities to be scheduled, each entity associated with one of a plurality of sessions, each session having a share; assigning a timestamp to each entity; associating with each unique assigned timestamp a rate sum representing a sum of shares for sessions which include entities having the unique assigned timestamp and, a next sum representing a sum of shares for sessions which include entities having the unique assigned timestamp in which the sessions also include an entity having a timestamp smaller than the unique assigned timestamp; using the rate sums and the next sums to incrementally maintain a backlog rate representing a sum of shares for sessions which are backlogged; maintaining a virtual time based on the backlog rate; and, computing timestamps for subsequently received entities based on the virtual time.

Further features and advantages of the invention are described below.

BRIEF DESCRIPTION OF DRAWINGS

In figures which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
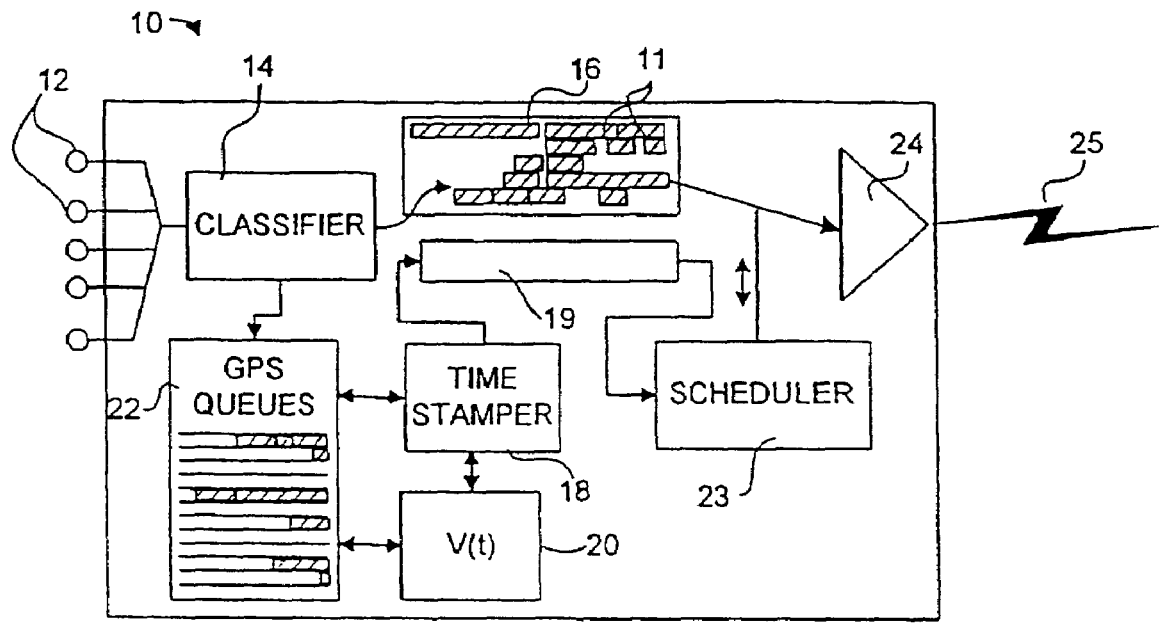
FIG. 1 is a schematic view of apparatus according to this invention.

FIG. 1 illustrates a packet forwarding apparatus 10 according to one embodiment of this invention. Apparatus 10 receives data packets 11 at a plurality of inputs 12. A classifier 14 classifies each of the incoming data packets as being associated with one of a plurality of sessions. The sessions may, for example, each correspond to a group of packets for which it is desired to provide a certain level of QoS.

A time stamper 18 computes a timestamp for each packet. The timestamp is a function of either a virtual time 20 maintained by time stamper 18 or the timestamp of a previous packet 11 which has been assigned to the same session in GPS queues 22 by classifier 14. Time stamper 18 also maintains GPS queues 22 which contain records of any packets 11 in each session maintained by the system in order of their timestamps. The timestamps indicate the order in which the packets 11 would be transmitted if the packets were fluid packets being transmitted in a GPS system.

Packets to which timestamps have been assigned are held pending transmission in a pending packet storage 16. Packet storage 16 may be, for example, a memory or other suitable storage device accessible to a scheduler 23. The organization of packets 11 in packet storage 16 is not critical to this invention. Pending packet storage 16 could optionally be arranged by session to facilitate individualized buffer management for different sessions or groups of sessions. Typically, as is known to those skilled in the art, packet storage 16 will include a memory manager (not shown) which allocates space in packet storage 16 to packets 11 as they arrive and reclaims space in pending packet storage 16 after packets 11 have been dispatched.

Each packet 11 in pending packet storage 16 is associated with the timestamp which has been assigned to the packet by timestamper 18. This may be done, for example, by providing a data structure 19 which contains a record for each packet 11, each record containing a pointer to the corresponding packet 11 in pending packet storage 16 and the timestamp for the packet. The timestamps are not required to be unique. It is not necessary for data structure 19 to contain other information such as the session to which the packet 11 has been assigned by classifier 14. As discussed below, data structure 19 may be in common with a data structure used by timestamper 18 or may be separate as illustrated in FIG. 1.

Scheduler 23 directs packets 11 from pending packet storage 16 to a dispatcher 24 which transmits the packets onto a data link 25 in order of timestamp. Each GPS queue 22 may be either empty (i.e. "idle") or backlogged. If the GPS queue 22 is backlogged it may contain one packet or multiple packets. If the GPS queue 22 contains only one packet then the GPS queue 22 will become empty after that one packet departs (as long as no other packets are placed into that queue 22 by classifier 14 in the meantime).

In a typical packet handling device with m inputs, if all inputs simultaneously forward packets to the same output link, then these packets enter the output scheduler in a certain order. In other words packet arrivals are serialized so that apparatus 10 will typically receive packets one at a time. This packet "serialization" process introduces a small fixed delay in a packet path which can be easily accounted for in delay calculations. In typical switches and router designs an output buffer runs at several times the input link speed. In this case the fixed serialization delay becomes insignificantly small.

Each time a packet is received by apparatus 10, the packet is assigned a timestamp according to equation (6). This invention provides novel methods for maintaining a virtual time v(t) which requires lower computational overhead than the WFQ method described above.

The slope of a virtual time function depends upon the total bandwidth assigned to queues which are not empty. There are only two events that effect the slope of the virtual time function. The slope of v(t) changes upon the arrival of a packet to an idle session (this causes the slope to decrease). The slope of v(t) also changes upon the departure of the last packet of a session (after which the session becomes idle). This causes the slope to increase. In between these two events, the slope of the virtual time remains fixed since the set of backlogged sessions is fixed.

Whenever an arrival to an idle GPS queue 22 occurs time stamper 18 computes a value for v(t). Although the departure of the last packet of a backlogged session from a GPS queue (henceforth, referred to as the event of a newly idle session) affects the slope of v(t) it is only necessary to consider this when the next arrival to an idle session takes place. This is because v(t) is used only when calculating the timestamp of newly backlogged sessions. In order to properly calculate v(t) it is necessary to know the time(s) at which the event of newly idle sessions took place. Packets are typically dispatched serially by dispatcher 24. Multiple packets may depart from a GPS queue 22 simultaneously.

Although only the departure of a packet from a session which leaves the session idle affects the slope of virtual time, it is convenient to consider any departure of a packet from a GPS queue 22 as being an event that might potentially affect the slope of v(t). An implementation of the invention which does this can be concerned with only two types of events, arrivals to idle sessions and departures from GPS. If either of these events occur then time stamper 18 will need to take them into account when it calculates the value of virtual time.

Time stamper 18 starts with the value of v(t) at a first event, determines the slope of v(t) between the first event and a subsequent second event and computes v(t) at the second event. Time stamper 18 can repeat this process to maintain v(t) over a series of events. When time stamper 18 is initialized, time and virtual time may both be set to zero. The first packet to arrive to apparatus 10 will be an event of a newly backlogged session in GPS queues 22. Where the virtual time starts initially with the value zero, the initial timestamp will be $L/\rho_1$. If the second packet which arrives at apparatus 10 is for the same session as the first packet, the timestamp for the next packet will be the timestamp for the first packet plus the length of the second packet divided by the service share for the session. If the second packet arrives in a different session from the first packet then one must obtain a value for v(t) at the time of arrival for the second packet to compute a timestamp for the second packet. Thus, computing the time stamp of a packet can be done with knowledge of how the virtual time changes in the interval between two consecutive events of the type in which a packet arrives to an idle session.

After a packet arrives to an idle session and before the next arrival to an idle session, two possible scenarios could happen. The first is that no packet departures take place. The second is that one or more departures take place. In the first case, the set of backlogged sessions remains fixed between the two arrivals to idle sessions (and the slope of v(t) is constant between these two arrivals. In the second case, the set of backlogged sessions could change between the event points. Whether the slope of the virtual time function changes or not depends upon whether any of the departures from GPS leave their GPS sessions idle.

Figure 2:
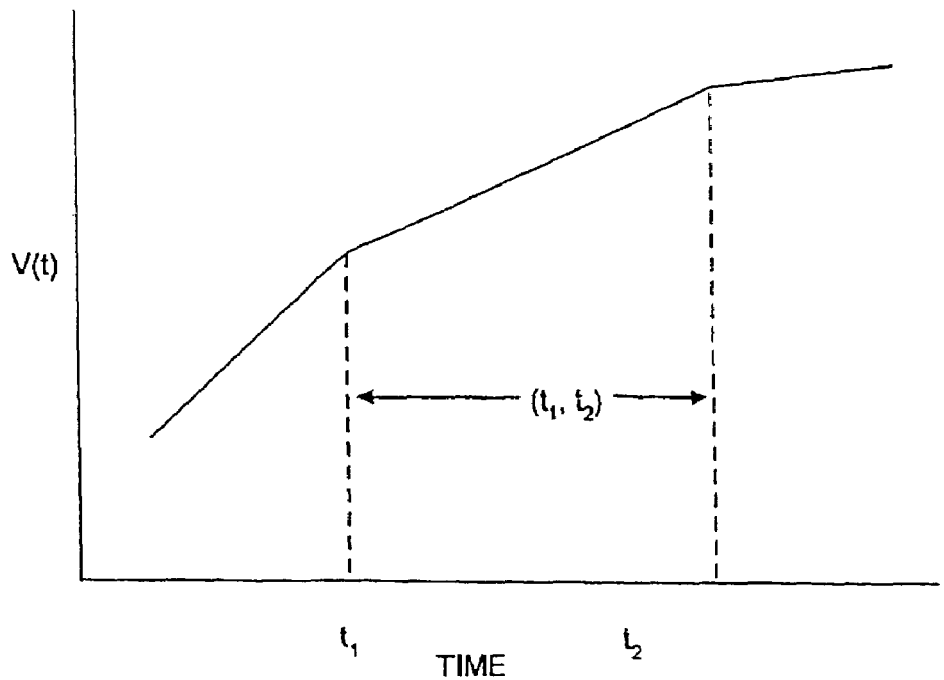
FIG. 2 is a graph illustrating the slope of a virtual time function in an interval where there are no events of packets which depart to leave a session idle in the interval.
Figure 3:
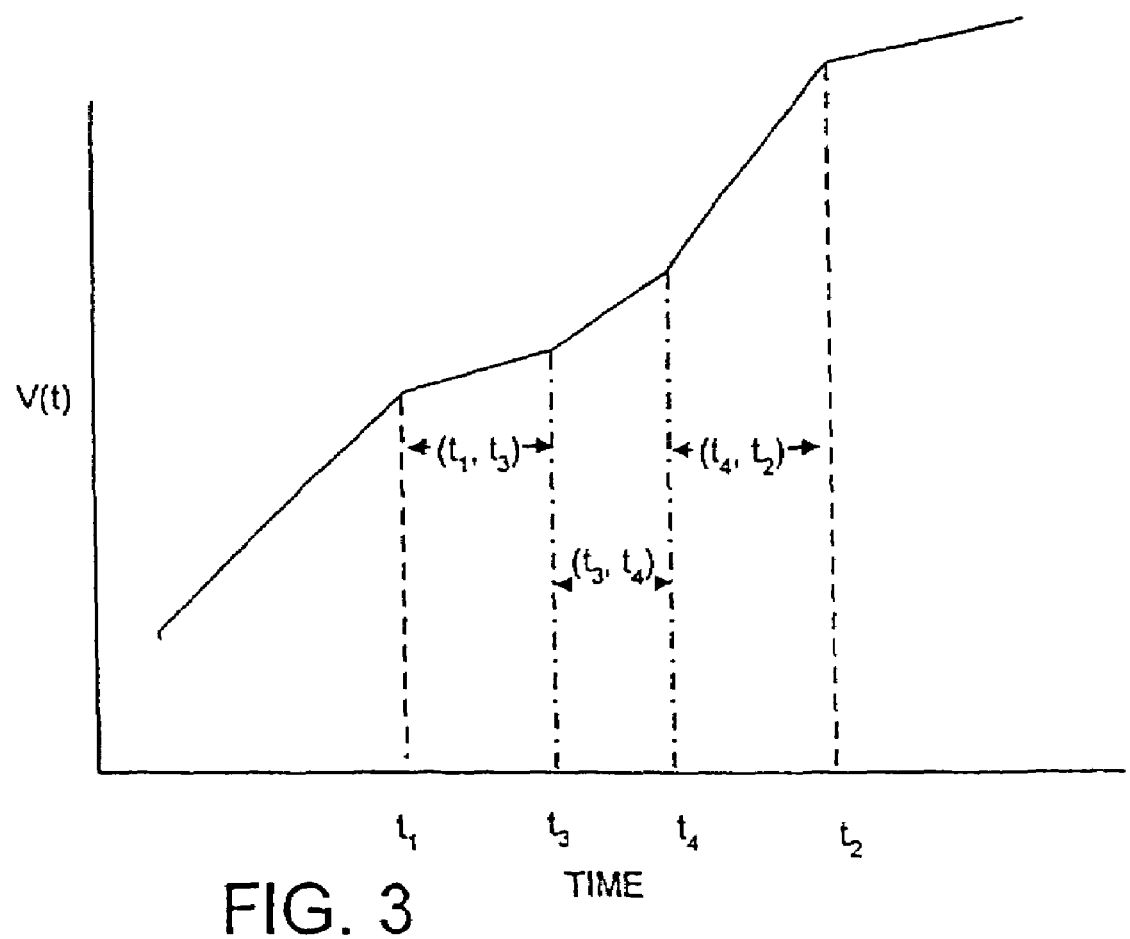
FIG. 3 is a graph illustrating the slope of a virtual time function in an interval where there are two events of packets which depart to leave a session idle in the interval.

For example, consider the case in which at time $t_1$ one session becomes newly backlogged and at time $t_2$ another session becomes newly backlogged. No sessions become newly backlogged between times $t_1$ and $t_2$. If no departures occur in between times $t_1$ and $t_2$ then the virtual time has a constant slope between times $t_1$ and $t_2$ as shown in FIG. 2. If two departure events take place at times $t_3$ and $t_4$ between the two arrivals to idle sessions (events at $t_1$ and $t_2$) and the departures leave their GPS queues idle then the virtual time function has the behaviour shown in FIG. 3 between times $t_1$ and $t_2$.

In FIG. 2, during the interval $(t_1, t_2)$ the set of backlogged sessions remains fixed and the slope of v(t) remains constant. However, in FIG. 3, the slope changes in each of the three intervals between the events which occur at times $t_1, t_3, t_4$, and $t_2$. Note that the slope of the virtual time in the interval $(t_1, t_3)$ is the same as that of FIG. 2 in the interval $(t_1, t_2)$. At time $t_3$ some of the sessions that were backlogged in the interval $(t_1, t_3)$ become idle and are removed from the set of backlogged sessions. This causes the slope of the virtual time to increase in the interval $(t_3, t_4)$. Similarly, some sessions that were backlogged in the interval $(t_3, t_4)$ become idle at time $t_4$. This causes a further increase in the slope of the virtual time in the interval $(t_4, t_2)$.

Figure 4:
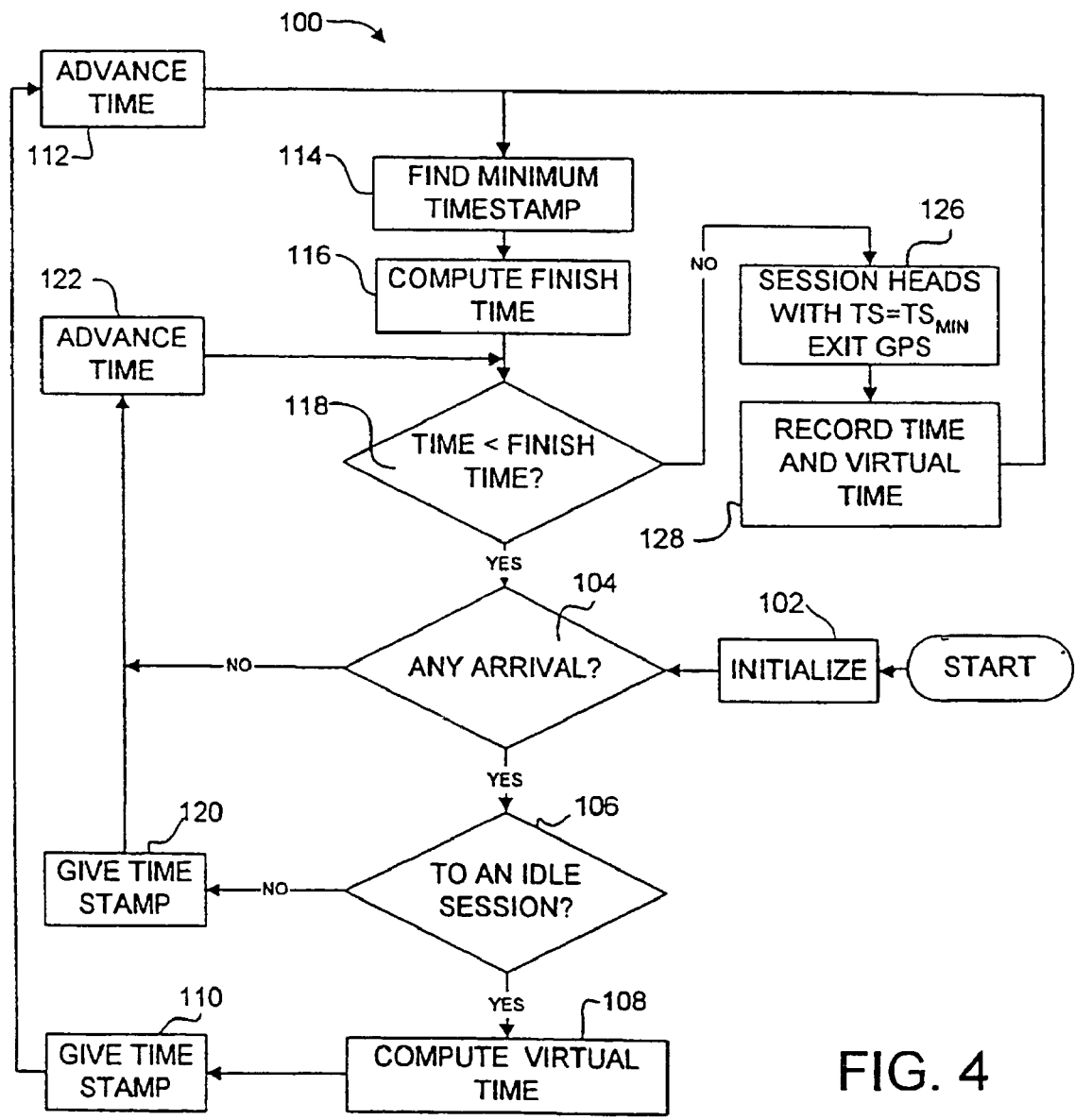
FIG. 4 is a flow chart illustrating a scheduling method according to the invention.

It can be seen that the value of the virtual time can be calculated between two consecutive events of newly backlogged sessions by tracking departures which result in newly idle sessions. This feature is used in methods according to this invention. A method according to the invention is illustrated in FIG. 4.

Let $t_i$ and $t_{i+1}$ denote the times of two consecutive newly backlogged session events (e.g. packet arrivals to empty queues). Also, let $V(t_i)$ denote the virtual time at time $t_i$. Let $TS_j$ be the timestamp of the packet at the head of the queue for session $j$. Then a GPS method which may be used in maintaining a timestamp function in a scheduler according to the invention, may be formulated as follows:

Begin GPS method:

1. Determine the minimum timestamp $TS_{min}$ at time $t_1$ as follows: (the +after $t_i$ indicates that any departures have been taken care of first before calculating the minimum):

$$TS_{min} = \min(TS_j), \forall TS_j \in B(t_i+) \qquad (8)$$

2. Calculate the finish time $t_{finish}$ for this minimum timestamp as follows:

$$t_{finish} = t_i + [TS_{min} - V(t_i)] \times \sum_{j \in B(t_i+)} \Phi_j \qquad (9)$$

The finish time is the time at which packets having the minimum timestamp will leave GPS.

3. If $t_{finish} \leq t_{i+}$ then all the sessions whose head packets have timestamps equal to $TS_{min}$ will exit the GPS scheduler at time $t_{finish}$. The slope of the virtual time may change at time $t_{finish}$ as a result of some sessions becoming idle. The virtual time at time $t_{finish}$ becomes:

$$V(t_{finish}) = TS_{min} \qquad (10)$$

4. If $t_{finish} \leq t_{i+1}$ find the new value of minimum timestamp $TS_{minnew}$ at time $t_{finish}$ after packets exit the GPS scheduler:

$$TS_{minnew} = \min(TS_j), \forall TS_j \in B(t_{finish}+) \qquad (11)$$

5. Find the value of the new finish time $t_{finishnew}$ corresponding to this new minimum timestamp $TS_{minnew}$:

$$t_{\textit{finishnew}} = t_{\textit{finish}} + [TS_{\textit{minnew}} - V(t_{\textit{finish}})] \times \sum_{j \in B(t_{\textit{finish}}^+)} \Phi_j \qquad (12)$$

If $t_{\textit{finishnew}} \leq t_{i+1}$ then just as in step 3 packets will exit the GPS scheduler at this new finish time. The new finish time will have a virtual time equal to the new minimum timestamp:

$$V(t_{\textit{finishnew}}) = TS_{\textit{minnew}} \qquad (13)$$

6. The minimum timestamp and next finish time are calculated for the new finish time $t_{\textit{finishnew}}$ Steps 4 and 5 are repeated until the next calculated finish time is greater then $t_{i+1}$. Let $\eta_{\textit{last}}$ be the time of packet departures whose next calculated finish time is greater than $t_{i+1}$.

7. If $\eta_{\textit{last}} < t_{i+1}$ calculate the virtual time at time $t_{i+1}$ as follows:

$$V(t_{i+1}) = V(\eta_{\textit{last}}) + \frac{[t_{i+1} - \eta_{\textit{last}}]}{\sum_{j \in B(\eta_{\textit{last}}^+)} \Phi_j} \qquad (14)$$

End GPS method.

Note that this GPS method enables us to find the value of virtual time at the next event of newly backlogged sessions given the value of virtual time at the previous event of newly backlogged sessions. The method can be initiated at time zero with virtual time set equal to zero.

FIG. 4 is a flow chart which illustrates a GPS method 100 which may be used in this invention. Method 100 may be implemented in software by providing a sequence of computer instructions which cause a processor to execute method 100 and then causing a processor to execute those instructions.

Method 100 begins by initializing time stamper 18 with suitable values for time and virtual time (step 102). Method 100 then checks to see if any arrival events have occurred (step 104). If so then method 100 checks to see whether or not the arrival events relate to a session which was previously idle (step 106). If so then method 100 computes the virtual time (step 108). Method 100 may do this by maintaining values for Time (which contains a number representing the current system time), $TS_{\textit{init}}$ (which contains the value of the virtual time at the most recent event which could affect the slope of v(t), and $t_{\textit{init}}$ (which contains the value of the time at the most recent event which could affect the slope of v(t)). In step 108 $TS_{\textit{init}}$ may be set as follows:

$$TS_{\textit{init}} = TS_{\textit{init}} + \frac{[\text{Time} - t_{\textit{init}}]}{\sum_{i \in B(t_{\textit{init}})} \Phi_i} \qquad (15)$$

In step 108 $t_{\textit{init}}$ is set to the current value of Time.

Method 100 continues by assigning a timestamp to the packet (step 110). The timestamp is computed using the value of $TS_{\textit{init}}$ determined by step 108 as the variable part. Method 100 then advances the value of Time (step 112) and searches GPS queues 22 to determine the minimum value of the timestamp for all queued packets (step 114). The minimum timestamp will be possessed by a packet which is at the head of one of the GPS queues.

In step 116 method 100 computes the GPS finish time for packets which have the minimum time stamp determined in step 114. This may be accomplished by applying the following formula:

$$t_{\textit{finish}} = t_{\textit{init}} + [TS_{\min} - TS_{\textit{init}}] \times \sum_{i \in B(t_{\textit{init}})} \Phi_i \qquad (16)$$

Method 100 then checks to determine whether the finish time computed in step 116 has been reached (step 118). If not then method 100 proceeds to step 104 to determine if any new packets have been received. If no new packets have been received then method 100 advances the value of Time (step 122) and loops back to step 118.

Eventually the value of Time will equal or exceed the finish time computed in step 116 for packets having the minimum timestamp. When this occurs then step 118 directs the execution of method 100 to step 126 which removes packets which have been assigned the minimum timestamp from GPS queues 22. Step 128 then records the time and virtual time at which this GPS departure event occurred. Step 128 may, for example, setting values for $t_{\textit{init}}$ and $TS_{\textit{init}}$ to equal the current values for Time and $TS_{\min}$ respectively. Method 100 then continues at step 114.

When a packet is received to an already-backlogged session then step 106 directs the execution of method 100 to step 120 which computes a timestamp for the newly-arrived packet as a function of the timestamp of the previous packet in the session and the length of the packet.

It can be appreciated that method 100 may be applied to maintain timestamps for packets 11 arriving at a packet handling device. The timestamps may then be used by a scheduler 23 to cause a dispatcher 24 to dispatch packets 11 in order of their timestamps. Where two or more packets 11 have the same timestamp scheduler 23 may select an order to send the packets in at random or may use a criteria such as length, arrival time, or the like to determine an order in which to send the packets.

Those skilled in the art will understand that method 100 only needs to perform two computations which are more than trivially computationally intensive. These occur in step 108, computing the virtual time ($TS_{\textit{init}}$), and in step 116, computing the finish time ($t_{\textit{finish}}$). Both of these computations contain the quantity:

$$\text{backlog rate} = \sum_{i \in B(t)} \Phi_i \qquad (17)$$

In this case, equation (14) becomes:

$$TS_{\textit{init}} = TS_{\textit{init}} + \frac{[\text{Time} - t_{\textit{init}}]}{\text{backlog rate}} \qquad (18)$$

and equation (15) becomes:

$$t_{\textit{finish}} = t_{\textit{init}} + [TS_{\min} - TS_{\textit{init}}] \times [\text{backlog rate}] \qquad (19)$$

Calculating the backlog rate requires knowledge of the set of backlogged sessions at any given time. Calculating the backlog rate by examining the session queues one by one is time consuming. The inventors have determined a way of reducing the time it takes to calculate the backlog rate. In systems and methods according to this invention the backlog rate is built up incrementally. When this is done the backlog rate can be calculated in a fixed number of operations after any event.

Figure 5:
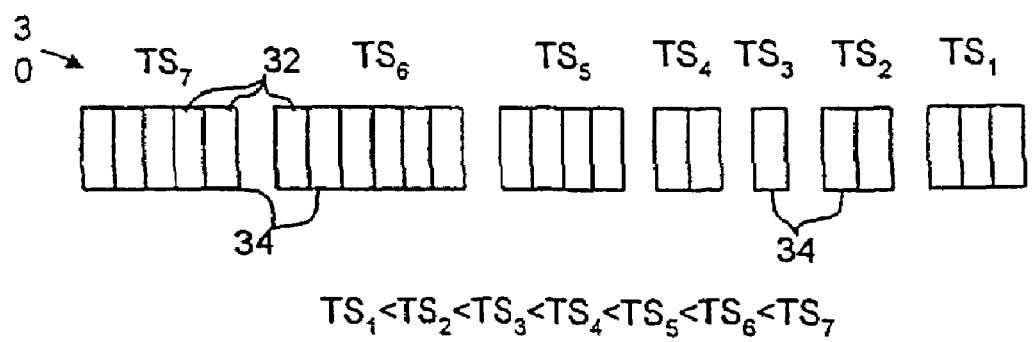
FIG. 5 is a schematic view of a data structure for containing records of packets sorted according to their timestamps according to the invention.

In preferred embodiments of the invention a data structure maintains records of all packets in the system in an order sorted by timestamp. FIG. 5 depicts schematically an example of a data structure 30 for use in the invention. Data structure 30 contains records 32 which correspond to packets 11. Records 32 are grouped into groups 34 by the value of the timestamp assigned to their corresponding packets 11. Groups 34 are sorted in order of timestamp. The example of FIG. 5 shows 23 packets with seven distinct groups of timestamps sorted in increasing order from $TS_1$ to $TS_7$. Each group 34 may contain several packets with the same timestamp $TS_i$. In a given group 34, records are preferably sorted in order of arrival time. In FIG. 5, the rightmost record in each group 34 corresponds to the first packet to arrive with a timestamp equal to the group timestamp. Packets are listed within a group 34 in an increasing order of arrival.

For example, the minimum timestamp group is $TS_1$ and it contains three packets. The packet at the rightmost end of the $TS_1$ group is the first packet to arrive to the system with at timestamp equal to $TS_1$. The packet to its left is the second packet to arrive to the system with a timestamp equal to $TS_1$ and so on. Because no two packets in the same session can have the same timestamp, all packets belonging to the same timestamp group 34 must belong to different sessions.

As discussed below, the number of unique timestamps assigned by timestamper 18, and therefore the number of groups 34 can be tuned by computing the timestamps for packets 11 to a desired precision. If timestamps are computed to a high degree of precision then it is likely that there will be more groups 34 which have distinct timestamps and that there will be fewer packets 11 associated with each group. If timestamps are computed to a lower degree of precision then it is likely that there will be fewer groups 34 each having a larger number of associated packets 11.

To facilitate computing the backlog rate quickly, this invention maintains for each distinct timestamp value (e.g. for each group 34) a "share sum" which is the sum of the shares of all the sessions which include a packet having the timestamp value. The invention also maintains a "next sum" for each distinct timestamp value. Next sum is the sum of the rates of all the sessions that have packets with timestamp TS and these packets are not the last packets in those sessions (i.e. there exist packets with a timestamp greater than TS that belong to these sessions).

Figure 7:
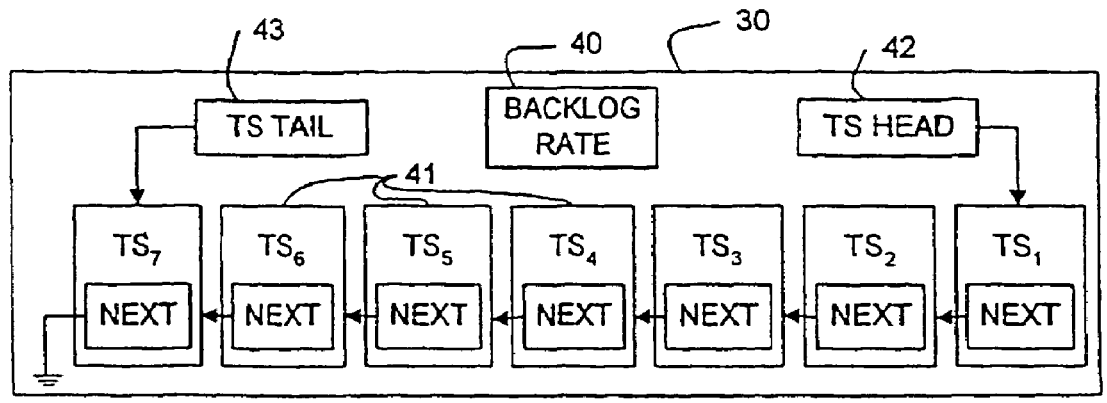
FIG. 7 is a schematic view of a particular embodiment of the data structure of FIG. 5.
Figure 8:
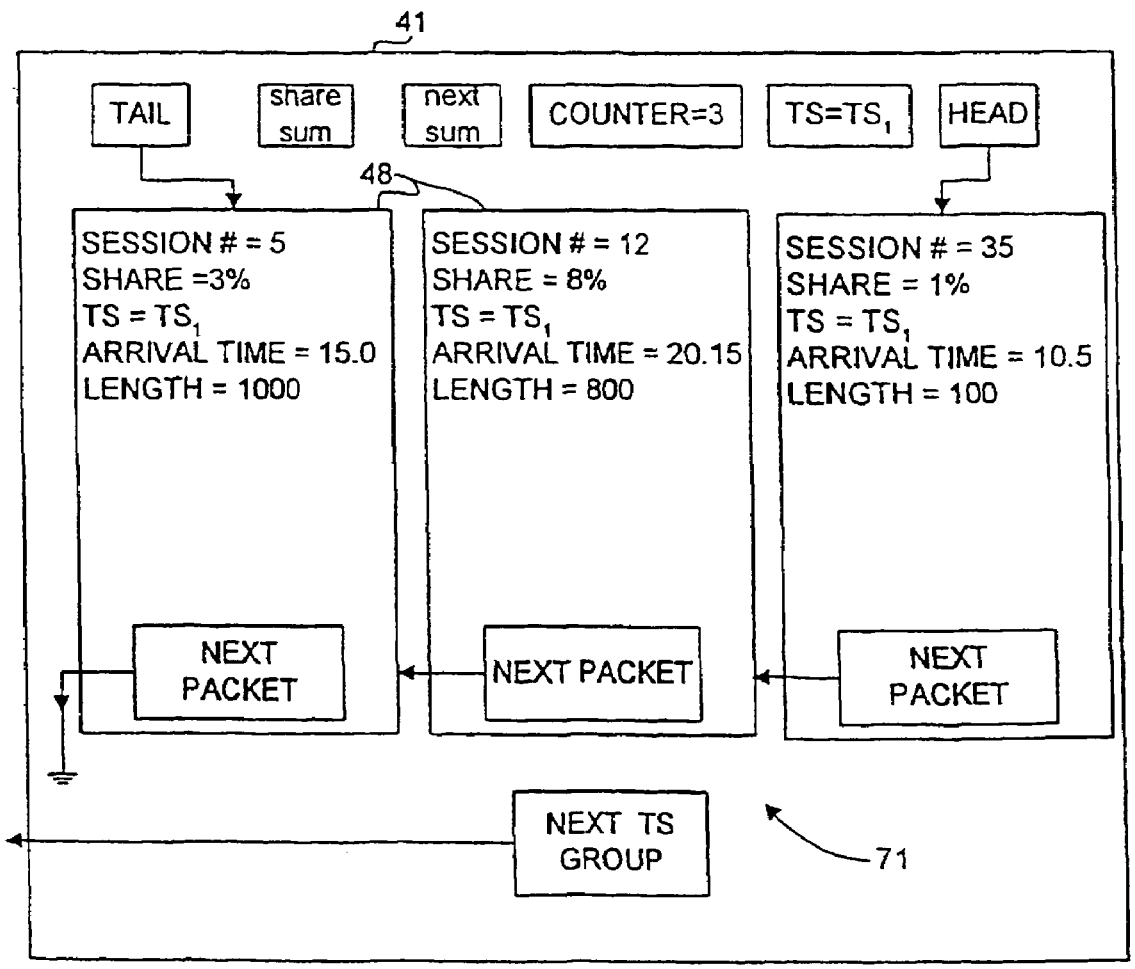
FIG. 8 is a schematic view of a portion of the data structure of FIG. 7.

In a preferred embodiment of the invention, data structure 30 contains a location 40 in which the current value for backlog rate is stored and a number of linked entities 41 each containing information about a timestamp group 34, as shown in FIG. 7. A location 42 contains a pointer to the entity 41 for the smallest timestamp in the system. A location 43 contains a pointer to the entity 41 for the last timestamp in the system. As shown in FIG. 8, each entity 41 contains a number of pieces of information including:

TS—a location holding the value of the timestamp of packets 11 associated with the group 34;

Head—a pointer identifying the head location of the timestamp group queue 71 (This queue is shown in FIG. 8 and holds records corresponding to packets 11 which belong to the timestamp group);

Tail—a pointer identifying the tail location of the timestamp group queue;

Counter—a counter containing a value representing a number of packets belonging to the timestamp group;

"share sum"—the sum of shares of all sessions having packets in the timestamp group;

"next sum"—the sum of shares of all sessions having packets in the timestamp group which are not the tail of their GPS session queue; and, Next pointer 70—a pointer to the structure 41 representing the next group 34.

An entity 41 representing a timestamp group comprises a queue of one or more packet records 48. Entity 41 has a packet record 48 containing information about each packet whose timestamp belongs to that timestamp group (TS group). For example, the minimum timestamp group $TS_1$ contains packet records 48 about all packets in the system which have a timestamp equal to $TS_1$. Each packet record 48 may contain the following information, as shown in FIG. 8:

Session_number—an index identifying the session the packet belongs to;

Share—the share of the session to which the packet belongs;

TS—the timestamp of the packet;

Arrival_time—The arrival time of the packet;

Length—the length of the packet; and,

Next Packet—a pointer to the next packet record 48 in the TS group 34.

The GPS queue position may also be included since it could be useful in some specific embodiments of the invention but in general is not required for proper operation of the invention.

Figure 9:
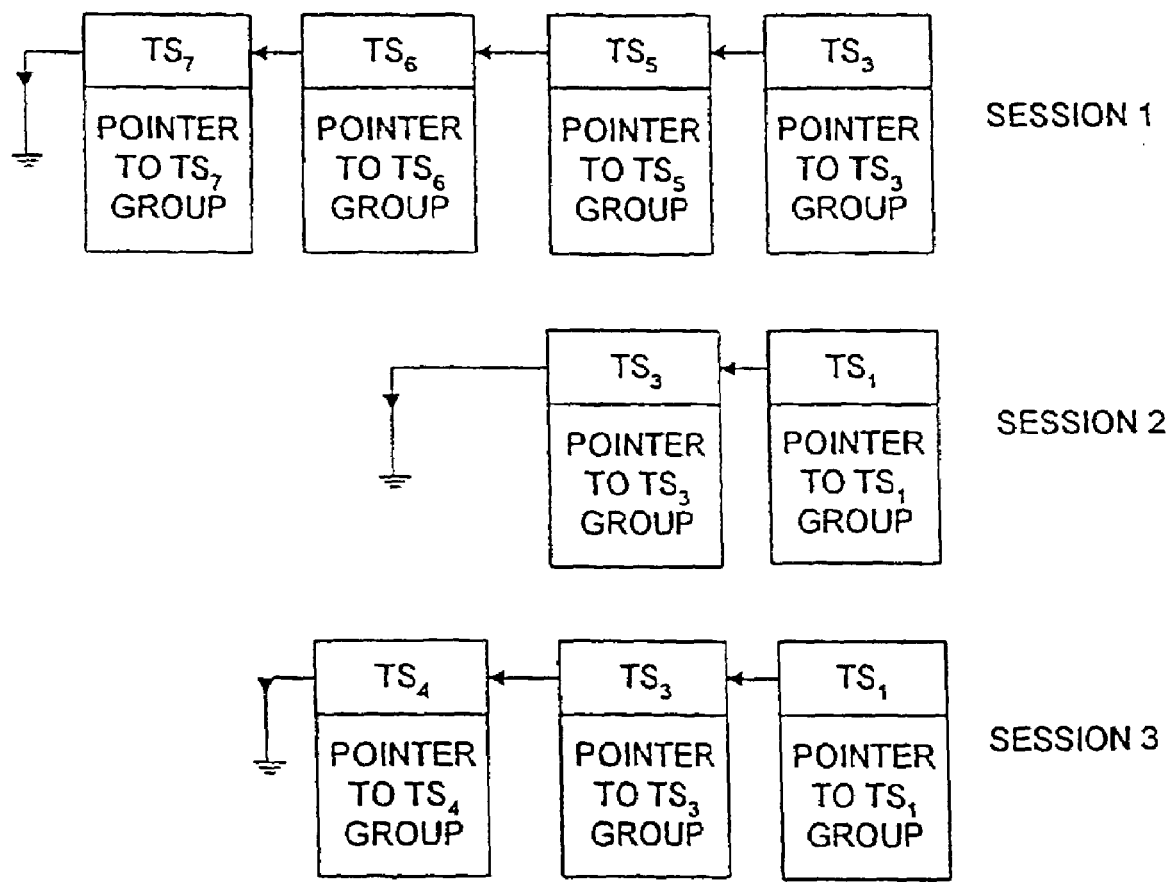
FIG. 9 is an example of a possible structure for a set of GPS queues for use in the invention.

FIG. 9 illustrates a possible structure for GPS queues 22. Those skilled in the art will understand that it is not necessary to enqueue actual packets in GPS queues 22. It is only necessary to store the timestamps of packets. A set of GPS queues 22 is useful for determining which sessions are backlogged and the position of a packet with respect to other packets in the same session. As shown in FIG. 9, in addition to timestamp values, an element in a GPS queue contains a pointer to the entity 41 in data structure 30 corresponding to the timestamp group 34 a packet belongs to. In FIG. 9, the head of each queue is on the right. The timestamp values in the example of FIG. 9 are to be equal to one of the seven values $TS_i$: i=1, 2, . . . , 7 which were used in the example of FIG. 5.

Figure 6:
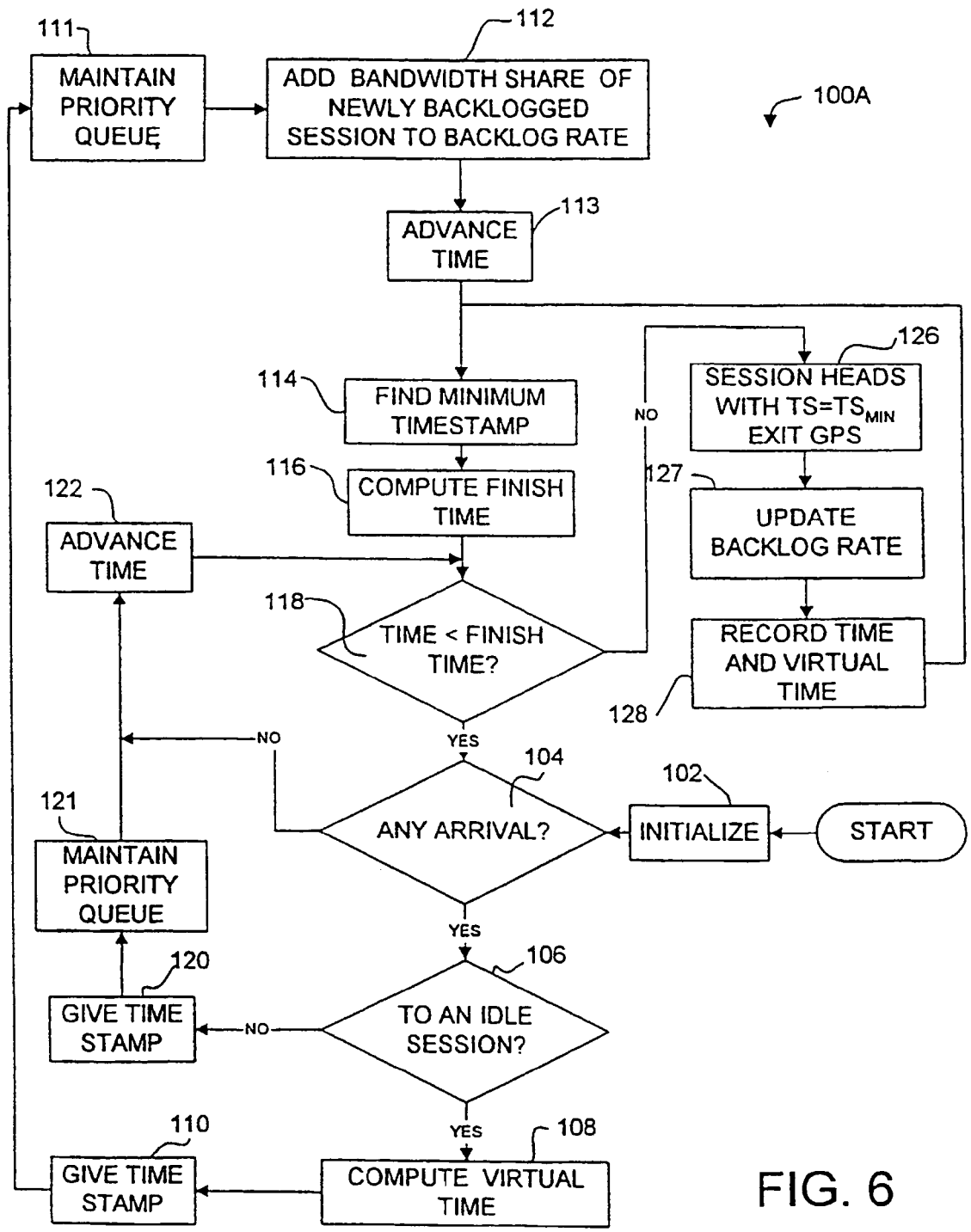
FIG. 6 is a flow chart illustrating a scheduling method according to an alternative embodiment of the invention.

With backlog rate maintained for the entire system and share sum and next sum maintained for each timestamp group 34 the method 100 of FIG. 4 can be modified to yield the method 100A of FIG. 6. In method 100A, whenever a timestamp group $TS_i$ leaves the GPS system, its next sum is set to be the sum of rates of all sessions that remain backlogged after the packets with timestamp $TS_i$ leave the GPS system. After such a departure method 100A determines an updated value for backlog rate by subtracting the share sum and adding next sum to the current value of backlog rate.

The overall flow of method 100A is similar to that of method 100. Method 100A shares a number of steps with method 100. Steps in method 100A which are in common with method 100 may be performed in the manner described above with respect to FIG. 4. Method 100A adds steps related to maintaining the priority queue data structure 30, and maintaining the backlog rate, the next sum and the share sum.

In method 100A, when a packet arrives to a session which is not idle, the packet receives a time stamp (step 120). In step 121 data structure 30 is maintained by adding the share Φ for the session in which the packet has arrived to the "next sum" for the group 34 to which the previous packet in the session belongs. Also, in step 121 a record for the packet is inserted into data structure 30 in a group 34 corresponding to the timestamp for the newly arrived packet. For that timestamp group 34 the share sum is increased by the share Φ for the session in which the packet has arrived. In step 121 a record for the packet is inserted into the appropriate GPS queue 22.

When a packet arrives in a session which was idle immediately prior to the arrival of the packet the virtual time is computed (step 108) and a timestamp is assigned to the packet (step 110). Then priority queue 30 is maintained (step 111). In step 111 a record for the newly arrived packet is inserted into data structure 30 in a group 34 corresponding to the timestamp for the newly arrived packet and the share sum for that timestamp group 34 is increased by the share D for the session in which the packet has arrived. In step 111 a record for the newly arrived packet is inserted into the appropriate GPS queue 22. The backlog rate is then increased by the share $\Phi$ for the session in which the packet has arrived (step 112) and the system clock is advanced (step 113).

Upon a timestamp group exiting GPS (step 126) the backlog rate is updated (step 127). Method 100A uses the next sum and the share sum for the timestamp group 34 which is exiting GPS to update the backlog rate as follows:

$$\text{Backlog rate} = \text{Backlog rate} - \text{share sum}(TS_{min}) + \text{next sum}(TS_{min}) \quad (20)$$

It can be appreciated that this yields an updated value for the backlog rate very quickly even if there are a very large number of sessions.

The calculated timestamp of a backlogged or newly backlogged session might result in a new value of timestamp and hence a new timestamp group. This new value should be queued in its proper place in the timestamp data structure 30. Data structure 30 should preferably be a priority queue structure to facilitate this insertion. A good priority queue implementation leads to shorter processing cycles and hence makes possible faster system clocks. This in turn leads to less scheduling delay for arriving packets since an arriving packet does not wait long until the start of the next system clock cycle.

In a currently preferred embodiment of the invention packet enqueue/dequeue from data structure 30 is the most time consuming operation that has to be completed within one system clock cycle. This is especially true when the number of distinct timestamps is large. Because all other operations can be completed in O(1) time only, the time complexity of virtual time/timestamp computations is determined by the time to enqueue/dequeue from a priority queue structure.

For example, a typical sequential realization of a priority queue with M elements can be based on a balanced heap data structure, with insert/delete time of O(logM). However, more efficient realizations may be based on a calendar queue data structure as described in R. Brown, *Calendar Queues: A Fast O(1) Priority Queue Implementation for the Simulation Event Set Problem*, Communications of the ACM, vol. 31, no. 10, October 1988, pp. 1220-27, which is incorporated herein by reference. Such data structures can result in O(1) time access in most cases. A suitable priority queue for holding data may also be provided in hardware, for example, on a suitably configured field programmable gate array (FPGA) or application specific integrated circuit (ASIC). Efficient hardware realizations of a priority queue based on systolic operation may require O(1) time for priority queue read (or delete). Insert operations may require longer times.

The inventors have determined that even a sequential O(log M) time access priority queue is adequate for attaining very high packet forwarding speeds.

Practical scheduling systems have finite clocks. In GPS, whenever the virtual time reaches the value of the timestamp of a packet queued in a GPS queue the packet exits GPS. With a finite system clock, each value of the clock may correspond to a range of virtual times. As a result, it is possible for more than one timestamp group to become eligible for transmission in a single system clock period. With the departure of each timestamp group, the virtual time is updated. When multiple groups depart in the same cycle, the virtual time will be updated several times within that clock period. The invention can handle multiple different time stamp groups departing GPS at the same time in various ways. In method 100A of FIG. 6, multiple departures are handled by the top right cycle (steps 114, 116, 118, 126, 127, and 128). this cycle calculates the next minimum timestamp after clearing a timestamp group. Method 100A repeats this cycle as many times as there are groups that are eligible for transmission. Note that the cycle includes a branch statement (step 118) that checks if a finish time of the minimum timestamp group has been reached in addition to the operation of clearing out timestamp groups and choosing the next eligible timestamp group (step 114).

One could save some execution cycles by varying method 100A to determine the finish times of all timestamp groups 34 which depart GPS in a single system clock cycle at once. Assume that a preset number of timestamp groups, M, exit GPS in a single system clock cycle. If no arrivals take place until the end of a clock cycle one can compute the finish times of all of these M timestamp groups at once. This is because the set of backlogged sessions is dependent only on the departing session packets. There are no arrivals during the M events.

Figure 10:
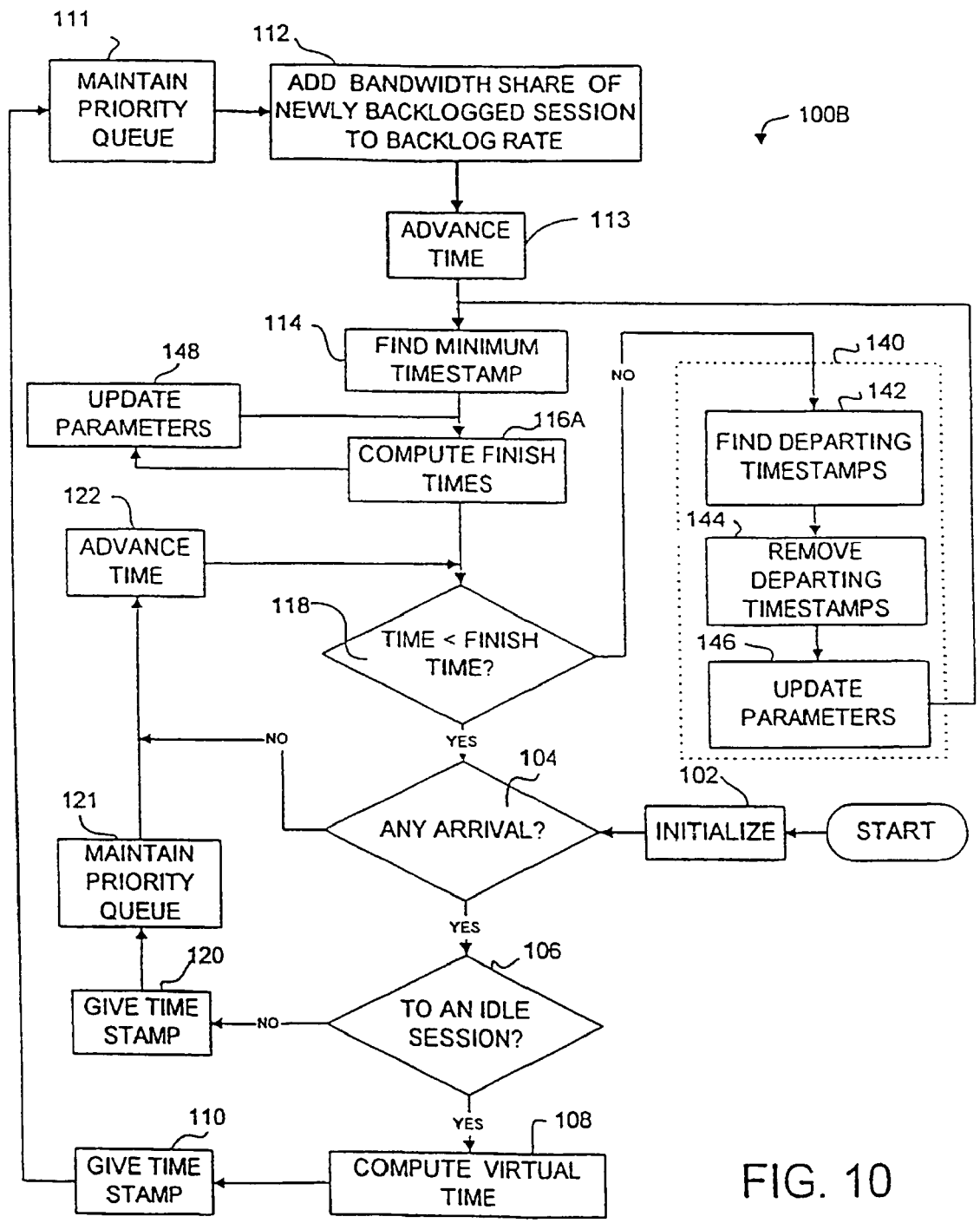
FIG. 10 is a flow chart illustrating a scheduling method according to a further alternative embodiment of the invention which provides an efficient way to take account of multiple departures.

FIG. 10 shows a method 100B that calculates the finish times of the M timestamp groups having the smallest finish times. Method 100B calculates in step 116A the finish time $t_1$ of the minimum timestamp group $TS_1$. Instead of immediately updating the backlog rate, method 100B calculates in step 148 a set of new sums, "$\text{sum}_k$" Each $\text{sum}_k$ contains a value which represents the sum of rates of backlogged sessions after the $k^{th}$ timestamp group departs GPS. Method 100B cycles through steps 116A and 148 M times, with k incremented each time. In each iteration of step 116A, method 100B determines the finish time for the next timestamp group. This continues until method 100B has determined the finish time $t_M$ of the $M^{th}$ timestamp group (if there are M timestamp groups in the system).

Step 116A calculates the finish time for each group according to:

$$t_{k+1} = t_{finish} = t_k[TS_{min} - TS_{init}] \times \text{sum}_k \text{ for } 0 \leq k \leq M-1 \quad (21)$$

The index k starts at zero and is incremented after each calculation of finish time. In equation (21) $\text{sum}_0$ is equal to the backlog rate and $t_0$ is equal to $t_{init}$. In each iteration, step 148 sets values for various parameters used to calculate the finish times of the M timestamp groups as follows:

$$\text{sum}_k = \text{sum}_{k-1} - \text{share sum}(TS_k) + \text{next sum}(TS_k) \text{ with } 1 \leq k \leq M, \text{ where } \text{sum}_0 = \text{Backlog rate} \quad (22)$$

$$t_{k+1} = t_{finish} \text{ for } 0 \leq k \leq M-1 \quad (23)$$

$$TS_{init} = TS_k \text{ for } 1 \leq k \leq M-1 \quad (24)$$

$$TS_{min} = TS_{k+1} \text{ for } 1 \leq k \leq M-1 \quad (25)$$

The value of the first finish time $t_1$ is tested in step 118 to determine the system clock period in which the next departure of a timestamp group from GPS will occur. If method 100B finds that Time equals or exceeds the finish time of the first timestamp group, method 100B immediately checks the remaining finish times which were calculated in step 116A to see which ones, if any are also less than or equal to the present value of time (step 142). If method 100B finds that only k<M of the timestamp groups for which finish times were calculated in step 116A have finish times less than or equal to the present value of Time, then only those first k timestamp groups are cleared (step 144) and both the finish time and virtual finish time of the $k^{th}$ timestamp group is kept (step 146), i.e.:

$$t_{init}=t_k \text{ for } TS_{init}=TS_k \qquad (26)$$

After clearing the k timestamp groups in step 140 method 100B loops back to determine the next M finish times after $t_k$. Method 100B could save time by using any remaining M–k finish times that were not eligible during the previous clock period.

If method 100B finds in step 140 that all M timestamp groups for which finish times have been calculated need to depart then method 100B will need to take into account the possibility that more timestamp groups after the $M^{th}$ group need to depart as well. If this happens, method 100B would need to cycle through steps 116A and 148 more than M times in each time period. In the currently preferred embodiment of the invention M is chosen to be large enough to guarantee that no more than M timestamp groups can depart in one system clock period. As described below, the number of simultaneous timestamp group departures can be controlled by selecting a system clock and timestamp system.

Another solution to this problem is to use a combination of methods 100A and 100B of FIG. 6 and FIG. 10. Such a method would calculate the departure times of the first M timestamp groups and then check to see whether they all depart in the same cycle. If so then the method could clear all the M timestamp groups at once as in method 100B and then go back to departing one timestamp group at a time as in method 100A until all eligible timestamp groups have departed.

Another solution is to make M variable so that it varies depending on different factors such as the size of the previous cycle for example.

GPS Scheduler Implementation

The following pseudocode illustrates a possible way to implement this invention in software running on a programmed computer.

Function GPS_simulation():

```
Start:
    Initialize( );
    Do
        Check_arrivals( );
        Check_for_End( );
        If GPS system did not become empty
            Advance_time( );
                If an arrival to an idle session or a departure took place
                    If TS_head = Null then exit and restart algorithm;
                    Else
                        TS_min becomes the value of TS_head:
                        TS_min = TS_head -> TS;
                        Calculate_finish_time( );
                    End else
                End if
                If Time = Finish_time
                    Kickout_min_TS group( );
                    Time_event = Time;
```

```
                    TS_event = TS_min;
                End if
            End if
        End Do
    End
```

Two variables Time_event and TS_event are used to store the last value of time and virtual time since a departure or an arrival to an idle session took place. The following is a description of the functions called in this pseudocode.

Function Initialize():

Clear the GPS session queues as well as the TS group queues.

```
Start:
    Time = 0;
    Virtual_time = 0;
    Time_event = 0;
    TS_event = 0;
End
```

Function Check_Arrivals():

```
Start:
    For i = 1, 2, ..., N
        If an arrival happens to session i
            If arrival to idle session
                Calculate_virtual_time( );
                Time_event = Time;
                TS_event = Virtual_time;
                Backlog_rate = Backlog_rate +       share of
                                                    session i;
            End if
            Give_timestamp(i);
        End if
    End loop
End
```

Function Check_for_End():

Check if TS_head=Null, if so then the busy period has expired and the GPS simulation should re-start.

Function Advance_Time():

advance the clock: Time=Time+Clock_period

Function Calculate_Finish_Time():

```
Start:
    Finish_time = Time_event + (TS_min–TS_event)*Backlog_rate;
End
```

Function Kickout_min_TS Group():

```
Start:
    Number of packets exiting GPS = TS_head -> Counter;
    Remove all packets in TS_head from the head of the GPS queue
    they belong to;
    Backlog_rate =Backlog_rate – (TS_head -> rate_sum) +
    (TS_head -> next_sum);
```

```
    Advance TS_head: TS_head = TS_head -> Next;
    Clear the old TS group;
End
```

Function Calculate_Virtual_Time():

```
Start:
    Virtual_time = TS_event + (Time – Time_event) /
    Backlog_rate;
End
```

Function Give_Timestamp(i):

```
Start:
    Calculate timestamp of arriving packet: Calculate_TS(i);
    Insert the packet timestamp information into both the GPS and TS
    group queues;
        If session i was backlogged before arrival
            Update Next_sum for the TS group of the packet
            ahead of the arriving packet in the ith GPS queue;
        End if
End
```

Function Calculate_TS(i):

```
Start:
    If session i is already backlogged when packet arrived
        Timestamp of arriving packet = Timestamp of
        previous packet in session i + Length of arriving
        packet / (rate of server * share of session i);
    End if
    Else
    Timestamp = Virtual_time + Length / (rate of server *
    share of session i);
    End else
End
```

WFQ Implementation

A system which implements WFQ according to this invention has a timestamp group data structure and a set of GPS queues. A packet scheduler schedules the output link according to the WFQ mechanism. Upon arrival of a packet, a timestamp is calculated using the state of both the timestamp group data structure and the GPS queues, as described above. Both the timestamp groups and GPS queues are interdependent. Once the timestamp of the arriving packet is determined, both the TS group and GPS queues are updated to include an entry for the new packet. The timestamp is also placed into the packet scheduler's priority queue. The scheduler then chooses for transmission the packet with the minimum value of timestamp.

The data structure 19 (FIG. 1) (which may also be called a WFQ priority queue) is similar to the GPS queues in that it only requires values of timestamps. In addition to the timestamp of a packet, data structure 19 needs to maintain information indicating the position of the packet in the pending packet storage 16 so that scheduler 23 can access the packet and cause the packet to be transmitted when its time to do so.

When a packet departs the WFQ scheduler, the packet can be deleted from pending packet storage 16 as it serves no further purpose for either the WFQ scheduler or the GPS simulation.

It is also possible in this invention to implement a WFQ scheduler 23 which uses timestamp data structure 30 instead of a separate data structure 19 to locate the packets 11 which have the lowest timestamps and should therefore be dispatched first according to the WFQ method. To accomplish this, data structure 30 should include some additional information. For example, data structure 30 may be arranged as shown in FIGS. 11 and 12.

Figure 12:
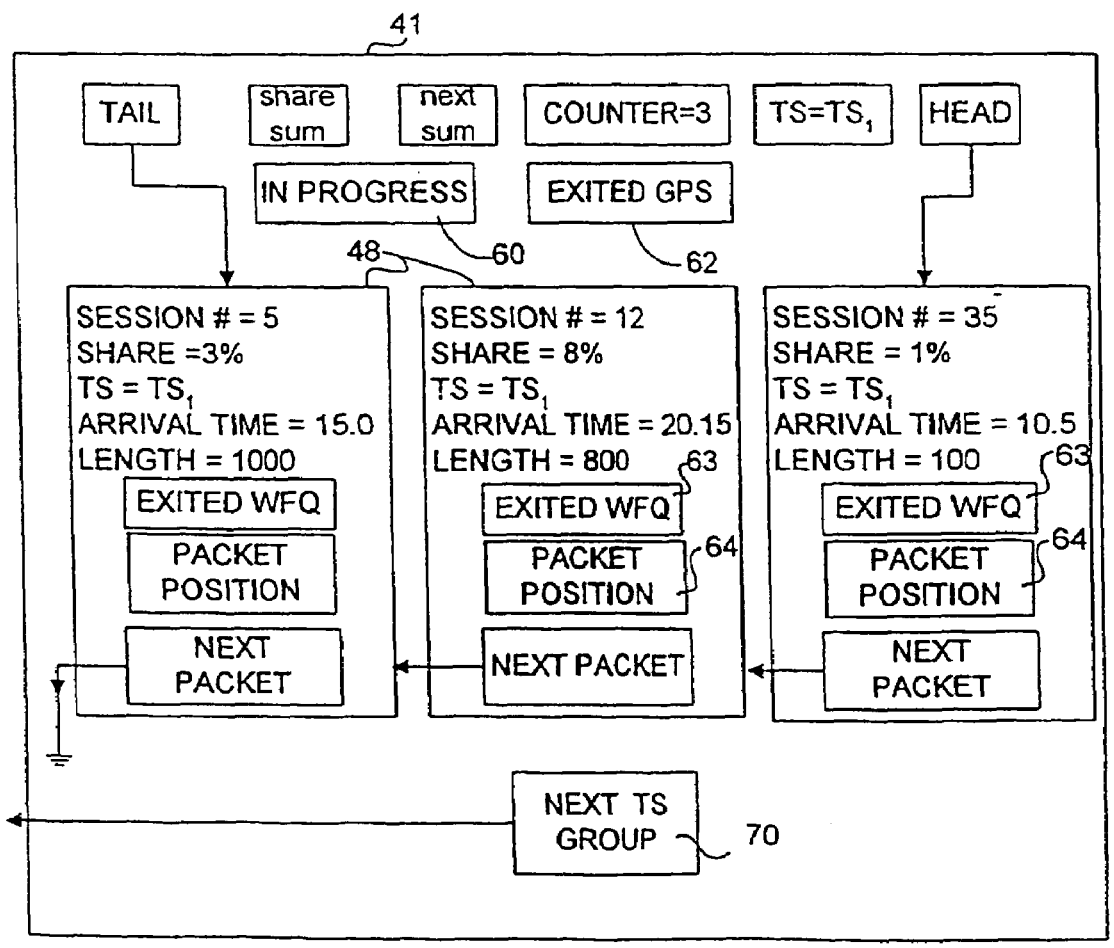
FIG. 12 is a is a schematic view of a portion of the data structure of FIG. 11; and, FIG. 13 is a flowchart illustrating a scheduling method according to a further alternative embodiment of the invention in which the same data structure is used both as a priority queue for WFQ and to maintain parameters for efficiently computing the virtual time.

As shown in FIG. 12, timestamp group structure 41 is modified by the addition of an IN PROGRESS pointer 60 which points to the position of the packet 11 in the timestamp group 34 that should be the next packet to be dispatched if the timestamp group to which the packet belongs has the smallest timestamp at the time of choosing the next packet to dispatch. EXITED GPS flag 62 is set when the timestamp group 34 represented by structure 41 exits GPS. The packet records 48 that belong to each timestamp group 34 are modified to include an EXITED WFQ flag 63. This flag is set only after a packet has been sent to dispatcher 24 by scheduler 23. Each packet record 48 also has a pointer 64 to the position of the corresponding packet 11 in pending packet storage 16.

Figure 11:
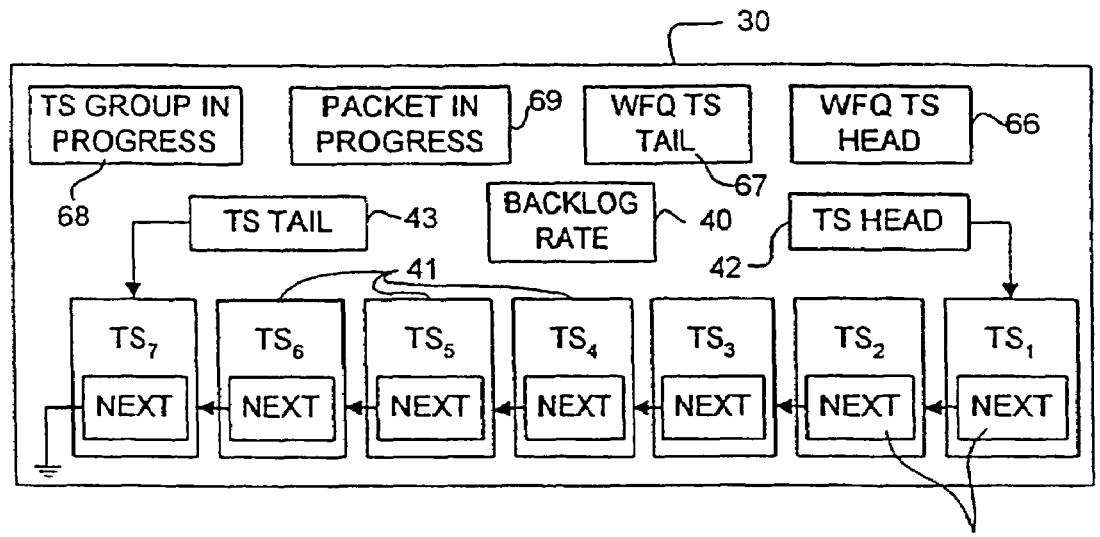
FIG. 11 is a schematic view of a particular embodiment of the data structure of FIG. 5 adapted for use in selecting packets to be dispatched in timestamp order.

As shown in FIG. 11, timestamp data structure 30 is also modified by the addition of a WFQ TS HEAD pointer 66. This pointer points to the position of the timestamp group structure 41 in data structure 30 which corresponds to the smallest timestamp for which one or more packets 11 have not yet been dispatched by scheduler 23. WFQ TS HEAD pointer 66 may not point to the same timestamp group as the TS HEAD pointer, which is the minimum Timestamp group in GPS. WFQ TS TAIL pointer 67 points to the largest timestamp group structure 41 which has already exited GPS but has packets 11 in pending packet storage 16 that have not yet been dispatched by scheduler 23. When WFQ TS HEAD is equal to TS HEAD then WFQ TS TAIL is set to be equal to TS HEAD. TS GROUP IN PROGRESS 68 and PACKET IN PROGRESS 69 are pointers which point to the timestamp group structure 41 and the packet record 48 for the packet that is currently being dispatched by scheduler 23.

Figure 13:
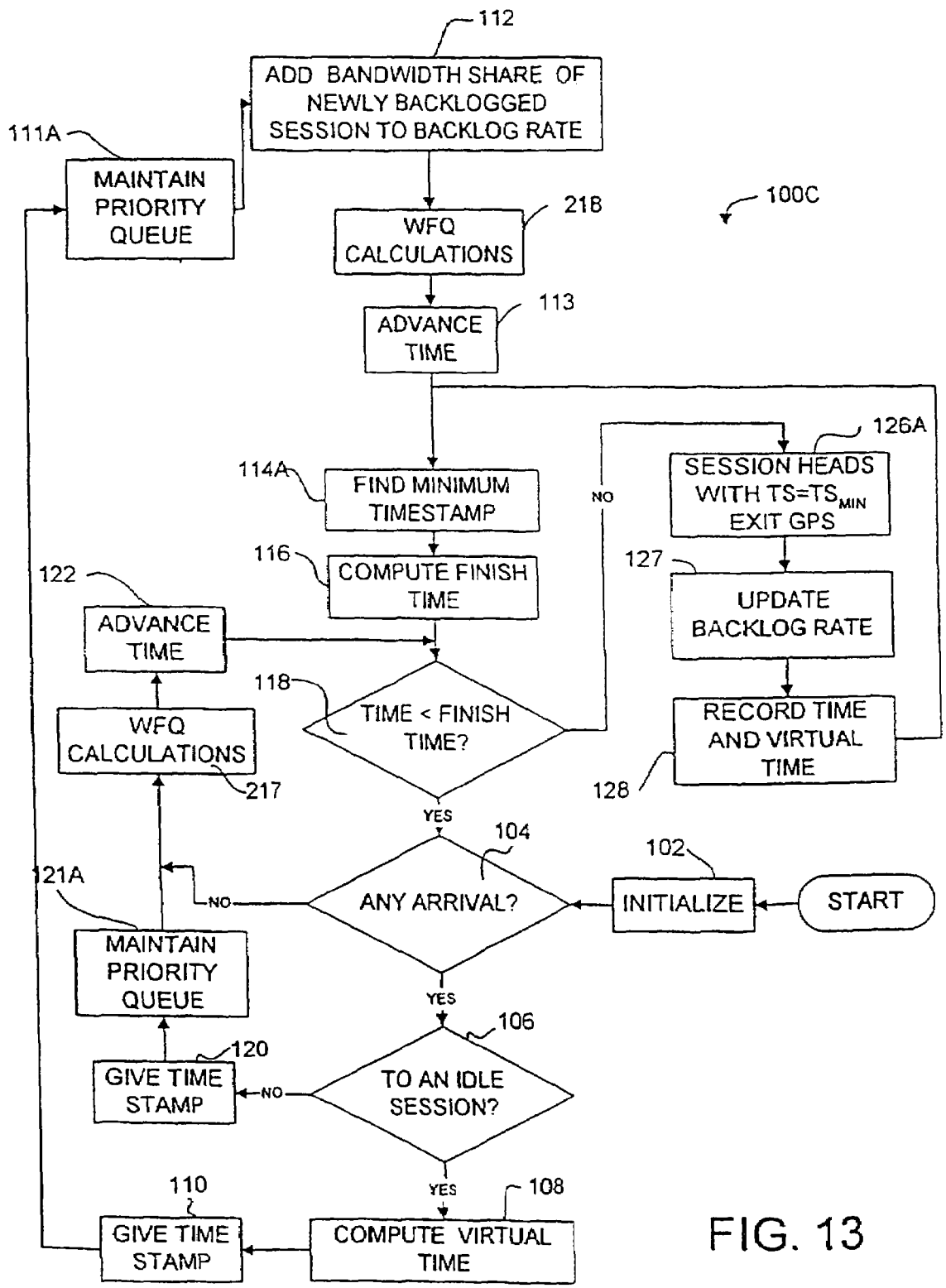

FIG. 13 illustrates a method 100C which permits timestamp group to be used by scheduler 23 to find an eligible packet for transmission to link 25 according to WFQ. Method 100C builds on method 100A of FIG. 6.

Step 114A finds the minimum timestamp, as described above but ignores any timestamp groups 41 for which the EXITED GPS flag 62 is set.

Instead of deleting a timestamp group structure 41 when the corresponding timestamp group leaves GPS, step 126A sets the EXITED GPS flag 62 for the group and makes WFQ TS TAIL pointer 67 point to the timestamp group structure 41. Step 126A also advances the TS HEAD pointer to the next timestamp group structure 41 as indicated by the NEXT pointer 70. If the group exiting GPS has IN PROGRESS pointer 60 pointing to NULL, this indicates that all the packets 11 in the corresponding timestamp group have been transmitted by scheduler 23 in WFQ. In this case the method deletes the timestamp group 41 and sets WFQ TS HEAD and WFQ TS TAIL pointers to point to the next timestamp group as indicated by pointer 70 (at this point the next timestamp group structure 41 will also be pointed to by TS HEAD pointer 42).

In steps 111A, and 121A, after a packet has been given a timestamp and a record 48 for the packet has been put at the tail of the appropriate timestamp group structure 41, method 100C checks IN PROGRESS pointer 60 for the timestamp group structure 41. If IN PROGRESS pointer 60 points to NULL then step 111A or 121A causes IN PROGRESS pointer 60 to point to the record 48 for the new packet. This is because if the new packet is the first packet in the timestamp group then IN PROGRESS should point to it. If the new packet is not at the head of its TS GROUP and IN PROGRESS is NULL then all of the other packets in the timestamp group must have all been already dispatched by scheduler 23 in WFQ. In this case, since the packet is the only one not yet transmitted, the IN PROGRESS pointer 60 should identify the new packet. Steps 111A, 114A, 121A, and 126A can otherwise perform the same acts as steps 111, 114, 121, and 126 which are described above.

Method 100C includes WFQ calculation steps 217 and 218. In each of steps 217 and 218 method 100C performs the following:

If the GPS system has been idle and is at the start of a busy period then set WFQ TS HEAD pointer 66 to the same value as TS HEAD pointer 42.

If WFQ TS HEAD pointer 66 has a value different from TS HEAD pointer 42 then set the NEXT pointer 70 in the timestamp group structure 41 identified by WFQ TS TAIL pointer 67 to point to the timestamp group structure 41 identified by TS HEAD pointer 42. This guarantees that the timestamp group structures corresponding to timestamps that have exited GPS but not WFQ (these timestamp group structures 41 start at the structure 41 identified by WFQ TS HEAD pointer 66 and end with the structure 41 identified by WFQ TS TAIL pointer 67) are connected to the structures 41 for timestamp groups which have not yet exited GPS (these timestamp group structures 41 start at the structure 41 identified by TS HEAD pointer 42).

If the timestamp associated with the structure 41 identified by WFQ TS HEAD pointer 66 is larger than the timestamp associated with the structure 41 identified by TS HEAD pointer 42 then set WFQ TS HEAD pointer 66 to point to the same structure 41 as TS HEAD pointer 42.

If Time≧WFQ finish time then the packet being transmitted is done and method 100C performs the steps of:

A) Update the information for the finished packet by setting the EXITED WFQ flag 63 in the packet record 48 identified by PACKET IN PROGRESS pointer 69 and advancing the IN PROGRESS pointer 60 of the timestamp group structure 41 identified by TS GROUPS IN PROGRESS pointer 68 to point to the next packet.

B) Find the next packet to leave WFQ and set the appropriate values for PACKET IN PROGESS and TS GROUP IN PROGRESS for this packet. Here there are two cases to consider: If the IN PROGRESS pointer of the structure 41 identified by WFQ TS HEAD pointer 66 is not NULL it is pointing to the required packet. If the IN PROGRESS pointer of the structure 41 identified by WFQ TS HEAD pointer 66 is NULL then it is necessary to search the timestamp group structures 41 after the timestamp group structure identified by WFQ TS HEAD pointer 66 to find the first one with an IN PROGRESS pointer 60 that is not NULL. In this case that pointer will be pointing to the required packet. During this search it is preferable to delete all timestamp groups structures 41 for which EXITED GPS flag 62 is set and IN PROGRESS pointer 60 is NULL starting from the structure 41 identified by WFQ TS HEAD pointer 66. This is because, if the WFQ TS HEAD (or any timestamp group after it) have already exited GPS and all the packets associated with the timestamp group have finished service in WFQ then they can be deleted and the WFQ TS HEAD pointer advanced.

Finally this part of method 100C calculates the finish time of the packet that has just started transmission in WFQ as follows:

$$WFQ \text{ finish time} = Time + \frac{packet\ length}{server\ rate}$$

$WF^2Q$ Implementation

Worst-case Fair Weighted Fair Queueing ($WF^2Q$) is a modification of WFQ that improves the worst-case fairness of WFQ. The worst-case fairness is an indication of how close the service a session receives in a packet scheduler is to that provided by GPS in any interval of time. In a $WF^2Q$ according to this invention a packet regulator queues packets and only chooses for transmission the packet with the minimum timestamp among the set of all eligible packets. A packet is eligible if its virtual start time is greater or equal to the present value of virtual time. The virtual start time of a packet can be calculated from its timestamp by subtracting the ratio of packet length to product of server rate and session share:

Virtual start time=timestamp−Length/(rate of server*session share)

A scheduler which implements $WF^2Q$, can be the same as a WFQ scheduler with the addition of a regulator that verifies that a packet is eligible before allowing it to be transmitted. If a packet is not eligible the next packet in the WFQ priority queue is checked for eligibility and so on.

A C-language based implementation of a WFQ scheduler according to this invention has been tested. The tests show that the WFQ implementation of this invention produces the correct output. The test system uses a system clock that synchronizes arrivals to the start of the clock period. The shorter the clock period the closer the simulations are to the actual GPS scheduler.

System Clock

The system clock duration may be either fixed or variable. If the system clock has a fixed period then preferably the period is smaller than the smallest inter-arrival times between two packets and also long enough to permit the completion of all the calculations needed in that period.

The operation of a scheduler according to the invention can be tuned by choosing an appropriate system clock period. Three factors influence the length of the system clock. One of these factors is the amount of queuing delay that is permissible. The choice of clock period affects the queuing delay because arriving packets are serviced at the start of a system clock period. The longer the system clock period, the longer a packet could be delayed.

A second factor in choosing the system clock period is the service order. The longer the clock period, the more likely it is that the order in which packets are serviced will be different from the order which the packets would be serviced if time were measured continuously. This is because it is convenient to treat any arrivals within a period as if they all arrived at the start of the next period. Although one can keep track of the exact arrival time of a packet it is not simple to use this information to calculate the virtual time at the time of a packet's arrival. If two packets arrive one after the other during a clock period they will both be treated as simultaneous arrivals. This may cause them to receive timestamps that cause them to be transmitted in an order different from the order that would occur had the clock been continuous.

A third factor that effects the length of the system clock is the time it takes to execute the longest cycle in the method. This time is dependent on the time it takes to update timestamp data structure 30. The faster one can insert into data structure 30, the shorter can be the cycles of the method and hence the shorter the clock period can become. This reduction in the length of the clock period may lead to a reduction in the number of simultaneous timestamp group departures.

It is desirable to choose a clock period which is long enough to finish the calculations in time (including the calculation of multiple timestamp departures) and yet is short enough to minimize delays and packet reordering that can result from long clock periods.

It can be more efficient to implement a WFQ algorithm with a variable clock period. The length of the period is the time it takes to fully execute an arrival or departure calculation. Hence, we start the cycle by finishing all the calculations involved in determining what timestamp groups should depart since the last cycle was executed. Since these calculations depend on the length of the previous cycle, one may end up with a longer or shorter current cycle. For example, if the previous cycle had no arrivals or departures and the present cycle has an arrival, one would expect the present cycle to be longer than the previous one. As a result, the cycles will vary with time depending on the arrival and departure pattern.

It is also possible to tune the operation of a scheduler according to this invention by adjusting the way that timestamps are selected. For example, one could choose timestamps from a set of discrete values such that the distance between different timestamp values is large enough to prevent two different timestamps from becoming eligible at the same time. The selection of timestamp accuracy has a strong impact on the implementation of WFQ. The more accurate the values of timestamps are, the less likely it is that there will be multiple departures in a single cycle. However, it could be computationally expensive to realize given the word length required to achieve good accuracy. Choosing a coarser accuracy for the timestamps on the other hand leads to a higher likelihood of multiple departures in a single clock period. The choice of timestamp accuracy is a compromise between having extensive calculations, on the one hand, and providing a system which has better fairness properties, on the other hand.

As will be apparent to those skilled in the art in the light of the foregoing disclosure, many alterations and modifications are possible in the practice of this invention without departing from the spirit or scope thereof. For example, the foregoing discussion assumes that the system clock has a period which is smaller than the inter-arrival times of packets. Schedulers according to this invention could accept multiple arrivals in the same period. Such schedulers would need to calculate more than one timestamp. In this case the value of virtual arrival time is the same for all of the arriving packets. The virtual time calculation is performed and each arriving packet is given a timestamp according to a calculation that depends on whether or not the packet belongs to an idle session. After the timestamps have been assigned and the arriving packets have been inserted into data structure 30 then departure calculations are performed. Where a system handles multiple arrivals it must be fast enough to insert more than one item into timestamp data structure 30 within a system clock period.

The foregoing discussion has used packet forwarding as an application of the scheduler of this invention. The scheduler could also be applied to scheduling the access of entities other than packets to resources other than a data link. For example, the invention could be applied to a scheduler for controlling the order in which software processes are executed on a multi-tasking computer system.

While various functional entities have been separately described herein, in many cases these entities can be combined. For example, the functions of scheduler 23 and dispatcher 24 could be combined in a single integrated scheduler/dispatcher which could be implemented in hardware and/or software.

While the above specific method examples include steps which are executed in a specific order, those skilled in the art will understand that the order of some of the steps can be varied in certain cases where a subsequent step does not require the result of a previous step without departing from the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for scheduling entities in a system, comprising:
  receiving, at a scheduler, entities to be scheduled, an entity being associated with one of a plurality of sessions, a session comprising a share;
  associating a timestamp with each entity based at least in part upon a virtual time;
  determining a backlog rate representing a sum of shares for backlogged sessions, wherein determining said backlog rate comprises:
    associating a share sum and a next sum with the timestamp, the share sum representing a sum of shares for sessions for entities associated with the timestamp, and the next sum representing a sum of shares for sessions for an entity comprising the timestamp and at least one other entity associated with another timestamp that is greater than the timestamp; and
    determining said backlog rate representing said sum of shares for backlogged sessions based on the share sum and the next sum;
  maintaining the virtual time based at least in part upon the backlog rate; and
  computing timestamps for subsequently received entities based at least in part upon the virtual time.

2. The method according to claim 1, wherein a timestamp record is associated with a linked list of records corresponding at least in part to packets comprising the timestamp associated with the timestamp record.

3. The method according to claim 1, wherein maintaining the backlog rate comprises:
  adding to the backlog rate the next sum; and
  subtracting from the backlog rate the share sum.

4. The method according to claim 1, wherein maintaining the backlog rate is performed if the timestamp equals a current virtual time.

5. The method according to claim 1, further comprising:
  maintaining a timestamp priority queue data structure comprising a timestamp record associated with the timestamp; and
  associating the share sum and the next sum with the timestamp record.

6. The method according to claim 5, wherein the priority queue data structure comprises a balanced heap.

7. The method according to claim 5, wherein the priority queue data structure comprises a calendar queue.

8. The method according to claim 5, wherein the priority queue data structure comprises a hardware priority queue.

9. The method according to claim 8, further comprising dispatching the entities in order of their respective timestamps.

10. The method according to claim 9, further comprising:
maintaining an eligible group of entities satisfying an eligibility criterion; and
dispatching the eligible group of entities.

11. The method according to claim 10, further comprising:
computing a virtual start time for the entities, wherein the virtual start time is not earlier than a current virtual time; and
including the virtual start time in the eligible group of entities.

12. The method according to claim 11, wherein the entities comprise packets to be dispatched on a communication Link, the method further comprising dispatching the packets in order of the respective time stamps associated with the packets.

13. The method according to claim 11, wherein the entities comprise processes to be executed on a processor, and the method further comprises executing the processes in order of their timestamps.

14. The method according to claim 1, further comprising dispatching the entities in order of their associated timestamps.

15. The method according to claim 1, wherein the entities comprise packets to be dispatched on a communication link, the method further comprising dispatching the packets in order of time stamps associated with the packets.

16. The method according to claim 1, wherein the entities comprise processes to be executed on a processor, the method further comprising executing the processes in order of time stamps associated with the processes.

17. The method according to claim 1, wherein the virtual time is computed substantially according to:

$$VT = VT_{init} + [\text{Time} - t_{init}]/\text{backlog rate}$$

wherein VT comprises the virtual time, $VT_{init}$ comprises an initial virtual time, Time comprises a system time and $t_{init}$ comprises an initial system time.

18. The method according to claim 1, further comprising:
creating a record for the entities in a priority queue data structure, and
organizing the record in the priority queue data structure by timestamp value.

19. The method according to claim 1, further comprising keeping a record of the timestamps in sorted order.

20. The method according to claim 1, wherein the virtual time comprises a function comprising a slope that is inversely proportional to the backlog rate.

21. The method according to claim 1, further comprising computing the virtual dine for a newly backlogged session, and for an entity that departs from Generalized Processor Sharing.

22. The method according to claim 1, further comprising:
maintaining a system time value;
computing a finish time for a minimum assigned timestamp; and
departing each entity associated with the timestamp from Generalized Processor Sharing for a finish time that is not less than the system time value.

23. An article comprising: a computer readable medium having stored thereon instructions that, if executed, result in:
receiving, at a scheduler, entities to be scheduled, an entity being associated with one of a plurality of sessions, a session comprising a share;
associating a timestamp with each entity based at least in part upon a virtual time;
determining a backlog rate representing a sum of shares for backlogged session, wherein determining the backlog rate comprises:
associating a share sum and a next sum with the timestamp, the share sum representing a sum of shares for sessions for entities associated with the timestamp and the next sum representing a sum of shares for sessions for an entity comprising the timestamp and at least one other entity associated with another timestamp that is greater than the timestamp; and
determining the backlog rate based on the share sum and the next sum;
maintaining the virtual time based at least in part upon the backlog rate; and
computing timestamps for subsequently received entities based at least in part upon the virtual time.

24. An article according to claim 23, wherein a timestamp record is associated with a linked list of records corresponding at least in part to packets comprising the timestamp associated with the timestamp record.

25. An article according to claim 23, wherein maintaining the backlog rate comprises:
adding to the backlog rate the next sum; and
subtracting from the backlog rate the share sum.

26. An article according to claim 23, wherein maintaining the backlog rate is performed if the timestamp equals a current virtual time.

27. An article according to claim 23, further comprising:
maintaining a timestamp priority queue data structure comprising a timestamp record associated with the timestamp; and
associating the share sum and the next sum with the timestamp record.

28. An article according to claim 27, wherein the priority queue data structure comprises a balanced heap.

29. An article according to claim 27, wherein the priority queue data structure comprises a calendar queue.

30. An article according to claim 27, wherein the priority queue data structure comprises a hardware priority queue.

31. An article according to claim 30, further comprising dispatching the entities in order of their respective timestamps.

32. An article according to claim 31, further comprising:
maintaining an eligible group of entities satisfying an eligibility criterion; and
dispatching the eligible group of entities.

33. An article according to claim 31, further comprising:
computing a virtual start time for the entities, wherein the virtual start time is not earlier than a current virtual time; and
including the virtual start time in the eligible group of entities.

34. An article according to claim 33, wherein the entities comprise packets to be dispatched on a communication link, the method further comprising dispatching the packets in order of time stamps associated with the packets.

35. An article according to claim 33, wherein the entities comprise processes to be executed on a processor, and the method further comprises executing the processes in order of their timestamps.

36. An article according to claim 23, further comprising dispatching the entities in order of their associated timestamps.

37. An article according to claim 23, wherein the entities comprise packets to be dispatched on a communication link, the method further comprising dispatching the packets in order of time stamps associated with the packets.

38. An article according to claim 23, wherein the entities comprise processes to be executed on a processor, the method further comprising executing the processes in order of time stamps associated with the processes.

39. An article according to claim 23, wherein the virtual time is computed substantially according to:

$$VT=VT_{init}+[\text{Time}-t_{init}]/\text{backlog rate}$$

wherein VT comprises the virtual time, $V_{init}$ comprises an initial virtual time, Time comprises a system time and $t_{init}$ comprises an initial system time.

40. An article according to claim 23, further comprising:
creating a record for the entities in a priority queue data structure, and
organizing records in the priority queue data structure by timestamp value.

41. An article according to claim 23, further comprising keeping a record of timestamps in sorted order.

42. An article according to claim 23, wherein the virtual time comprises a function comprising a slope that is inversely proportional to the backlog rate.

43. An article according to claim 23, further comprising computing the virtual time for a newly backlogged session, and for an entity that departs from Generalized Processor Sharing.

44. An article according to claim 23, further comprising:
maintaining a system time value;
computing a finish time for a minimum assigned timestamp; and
departing each entity associated with the timestamp from Generalized Processor Sharing for a finish time that is not less than the system time value.

45. A method, comprising:
receiving a packet to be dispatched on a communication link, the packet being associated with a session comprising a share;
computing a virtual time based at least in part upon a backlog rate representing a sum of shares for backlogged sessions,
assigning a timestamp to the packet based at least in part upon the virtual time;
inserting a record for the packet into a priority queue data structure sorted by timestamp, the priority queue data structure comprising a share sum and a next sum for each timestamp in the priority queue data structure, the share sum representing a sum of shares for entities associated with the timestamp, and the next sum representing a sum of shares for entities associated with the timestamp and at least one entity associated with a second timestamp that is greater than the timestamp;
determining a minimum timestamp in the priority queue data structure;
determining a finish time for the minimum timestamp;
deeming packets associated the minimum timestamp to be finished if the virtual time exceeds the finish time;
updating the backlog rate based at least in part upon the share sum and the next sum for the minimum timestamp; and
dispatching on the communication link packets deemed to be finished in order of their respective timestamps.

46. The method according to claim 45, further comprising assigning the timestamp to the packet based at least in part upon a previous timestamp of a previous packet that was backlogged immediately prior to receipt of the packet.

47. An article comprising: a computer readable medium having stored thereon instructions that, if executed, result in:
receiving a packet to be dispatched on a communication link, the packet being associated with a session comprising a share;
computing a virtual time based at least in part upon a backlog rate representing a sum of shares for backlogged sessions,
assigning a timestamp to the packet based at least in part upon the virtual time;
inserting a record for the packet into a priority queue data structure sorted by timestamp, the priority queue data structure comprising a share sum and a next sum for each timestamp in the priority queue data structure, the share sum representing a sum of shares for entities associated with the timestamp, and the next sum representing a sum of shares for entities associated with the timestamp and at least one entity associated with a second timestamp that is greater than the timestamp;
determining a minimum timestamp in the priority queue data structure;
determining a finish time for the minimum timestamp;
deeming packets associated the minimum timestamp to be finished if the virtual time exceeds the finish time;
updating the backlog rate based at least in part upon the share sum and the next sum for the minimum timestamp; and
dispatching on the communication link packets deemed to be finished in order of their respective timestamps.

48. An article according to claim 47, further comprising assigning the timestamp to the packet based at least in part upon a previous timestamp of a previous packet in the session.

49. An apparatus for bandwidth management and traffic prioritization in a network of devices, the apparatus having a processor and comprising:
means for receiving, at a network device, a packet to be scheduled, wherein the packet is associated with one of a plurality of sessions, a session comprising a share;
means for maintaining a record of a backlog rate representing a sum of shares for sessions that are backlogged based at least in part upon a share sum and a next sum associated with a timestamp, the share sum for the timestamp representing a sum of shares for entities associated with the timestamp, and the next sum for the timestamp representing a sum of shares for entities associated with the timestamp and at least one other entity associated with a second timestamp that is greater than the timestamp;
means for updating the record of the backlog rate for the packet, wherein the packet is received or dispatched;
means for associating, based at least in part upon the backlog rate, the timestamp to the packet, wherein the packet arrives at an idle session;
means for maintaining for the timestamp the share sum and the next sum; and
means for dispatching the packet in order based on the timestamp.

50. An article comprising: a computer readable medium having stored thereon instructions that, if executed, result in:
receiving, at a network device, packets to be scheduled, wherein each of the packets is associated with one of a plurality of sessions, a session comprising a share;

maintaining a record of a backlog rate representing a sum of shares for sessions that are backlogged based at least in part upon share sums and next sums associated with each timestamp, the share rate sum representing a sum of shares for entities associated with the timestamp, and the next sum representing a sum of shares for entities associated with the timestamp and at least one other entity associated with a second timestamp that is greater than the timestamp;

updating the record of the backlog rate for a packet that is one of received and dispatched;

associating, based at least in part upon the backlog rate, a timestamp to the packet, wherein the packet arrives at a session that was idle immediately prior to the arrival of the packet;

maintaining for the timestamp a share sum and a next sum; and dispatching the packets in order of their timestamps.

51. Apparatus for scheduling entities, the apparatus having a processor and comprising:

means for assigning timestamps to newly received entities based at least in part upon a state of a set of Generalized Processor Sharing queues and a virtual time, the set of Generalized Processor Sharing queues comprising records of timestamps associated with entities that are associated with one of a plurality of sessions, wherein each of the sessions comprises a share;

means for holding a value representing a backlog rate representing a sum of shares for those of the sessions that are backlogged in the Generalized Processor Sharing queues;

a priority queue data structure comprising a record for a unique timestamp in the Generalized Processor Sharing queues, the record comprising:

a share sum representing a sum of shares for sessions that comprise entities comprising the unique timestamp; and a next sum representing a sum of shares for those of the sessions that comprise: an entity comprising the unique timestamp and at least one other entity comprising a second timestamp greater than the unique timestamp; and means for dispatching packets in order of their timestamps.

52. Packet forwarding apparatus, the apparatus having a processor and comprising:

means for assigning timestamps to received packets;

a plurality of Generalized Processor Sharing session queues configured to receive packets comprising timestamps assigned by the means for assigning;

a priority queue data structure comprising a record of packets in the queues arranged in order of timestamp, the priority queue data structure comprising, for a unique timestamp in the Generalized Processor Sharing queues, a share sum representing a sum of shares for sessions corresponding at least in part to queues which comprise packets comprising the unique timestamp, and a next sum representing a sum of shares for those of the sessions corresponding at least in part to queues which comprise: a packet comprising the unique timestamp and at least one other packet comprising a second timestamp greater than the unique timestamp; and means for inserting records for a newly arrived packet into appropriate ones of the Generalized Processor Sharing session queues and the priority queue data structure.

* * * * *